(12) United States Patent
Williams

(10) Patent No.: US 7,692,125 B1
(45) Date of Patent: Apr. 6, 2010

(54) EVANESCENT WAVE COUPLING FOR FRESNEL DIRECTION FINDING

(75) Inventor: Brett A. Williams, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 834 days.

(21) Appl. No.: 11/288,639

(22) Filed: Nov. 29, 2005

(51) Int. Cl.
*F42B 15/01* (2006.01)
*G02B 6/26* (2006.01)
*H01Q 1/42* (2006.01)
*F42B 15/00* (2006.01)

(52) U.S. Cl. .................. 244/3.1; 244/3.15; 244/3.16; 343/872; 385/15; 385/27; 385/30; 333/24 R; 333/202; 333/208; 333/210; 333/245; 333/248; 333/252

(58) Field of Classification Search ........... 244/3.1–3.3; 343/872, 873; 318/478; 47/23.2; 385/15, 385/27–30; 333/24 R, 202, 208, 210, 245, 333/248–259
See application file for complete search history.

(56) References Cited

U.S. PATENT DOCUMENTS

| | | | | |
|---|---|---|---|---|
| 2,197,929 | A * | 4/1940 | Hale | 47/23.2 |
| 4,453,802 | A * | 6/1984 | Bridges et al. | 385/30 |
| 5,661,385 | A * | 8/1997 | McEwan | 318/478 |
| 5,815,124 | A * | 9/1998 | Manasson et al. | 333/248 |
| 6,851,645 | B1 | 2/2005 | Williams et al. | 244/3.16 |
| 7,154,590 | B2 | 12/2006 | Williams et al. | |
| 2005/0134513 | A1 | 6/2005 | Williams et al. | |
| 2006/0038977 | A1 | 2/2006 | Williams et al. | 356/28.5 |

FOREIGN PATENT DOCUMENTS

| | | | |
|---|---|---|---|
| EP | 1054470 A2 | * | 11/2000 |
| EP | 1096093 A2 | * | 5/2001 |
| WO | WO97/06518 A1 | * | 2/1997 |

OTHER PUBLICATIONS

R.C. Hansen "Radiation and Reception with Buried and Submerged Antennas"; IEEE Transactions on Antennas and Propagation; May 1963; pp. 207-216.*

P.D. Einziger et al., "Ray Analysis of Two-Dimensional Radomes"; IEEE Transactions on Antennas and Propagation; vol. AP-31, No. 6; Nov. 1983; pp. 870-884.*

D.M. Pozar, "A Magnetically Switchable Ferrite Radome for Printed Antennas"; IEEE Microwave and Guided Wave Letters; vol. 3, No. 3; Mar. 1993; pp. 67-69.*

B. Stupfel, "Impedance Boundary Conditions for Finite Planar or Curved Frequency Selective Surfaces Embedded in Dielectric Layers"; IEEE Transactions on Antennas and Propagation; vol. 53, No. 11; Nov. 2005 (received by publisher Mar. 17, 2005); pp. 3654-3663.*

(Continued)

*Primary Examiner*—Bernarr E Gregory
(74) *Attorney, Agent, or Firm*—Williams, Morgan & Amerson PC

(57) ABSTRACT

An apparatus includes a radome and an evanescent wave-coupled windowing system in the radome. In operation, the apparatus receives radiation reflected from an object that is incident upon a windowing system; emits evanescent waves from the windowing system whose amplitudes are proportional to the angle of incidence of the radiation; and non-coherent, Fresnel direction finds the object.

32 Claims, 15 Drawing Sheets

OTHER PUBLICATIONS

"Airborne Coherent Lidar for Advanced In-Flight Measurements (ACLAIM) Flight Testing of the Lidar Sensor," by Soreide, et al, American Meteorological Society 9th Convention on Aviation, Range and Aerospace Meteorology, Sep. 11-15, 2000.

"Electromagnetic Principles of Integrated Optics," by Lee, p. 51, Wiley & Sons, 1986.

"Evanescent Wave Coupling for Fresnel Direction Finding," by Williams, Lockheed Martin Missiles and Fire Control, Oct. 22, 2005.

"Lithium Niobate Microphotonic Modulators," by Cohen, Dissertation, May 2001.

"Microsphere Resonator Mode Characterization by Pedestal Anti-Resonant Reflecting Waveguide Coupler," by Laine, et al, IEEE Photonics Technology Letters, vol. 12, No. 8, Aug. 2000.

"Multi-Center Airborne Coherent Atmospheric Wind Sensor," by Miller, Global Hydrology & Climate Center, 1998.

"Optical Microsphere Resonators: Optimal Coupling to High-Q Whispering-Gallery Modes," by Gorodetsky, et al; Optical Society of America, vol. 16. No. 1, Jan. 1999.

"Optics," by Eugene Hecht, Table 7.1, p. 316, 4th Ed. Hecht, Addision Welsey, 2002.

"Optimization of Prism Coupling to High-Q Modes in a Microsphere Resonator Using a Near-Field Probe," by Mazzei, et al, Optics Communications 250, 2005, 428-433.

"Pulsed Coherent Solid-State 1.06μm and 2.1 μm Laser Radar Systems for Remote Velocity Measurement," 1222 SPIE Laser Radar V, 1990.

"Silicon Photodiode Integrated Circuits Ready for Mass Market Applications," by Leeb, Photonics Spectra, Aug. 2005, pp. 78-82.

"Two Dimensional Synthetic Aperture Imaging in the Optical Domain," by Bhashkansky, et al, 27 Optics Letters 15, 2002.

* cited by examiner

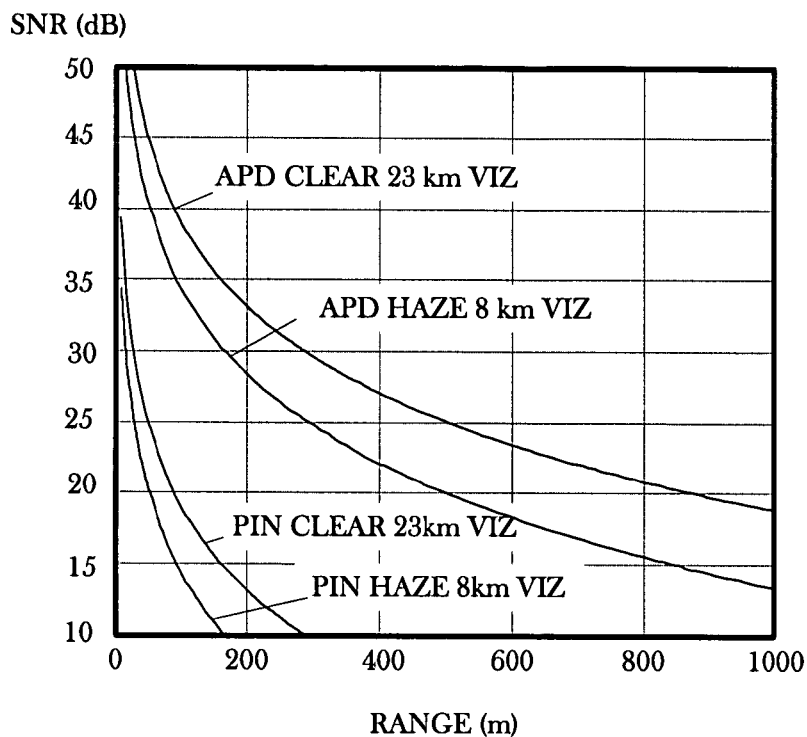
FIG. 22
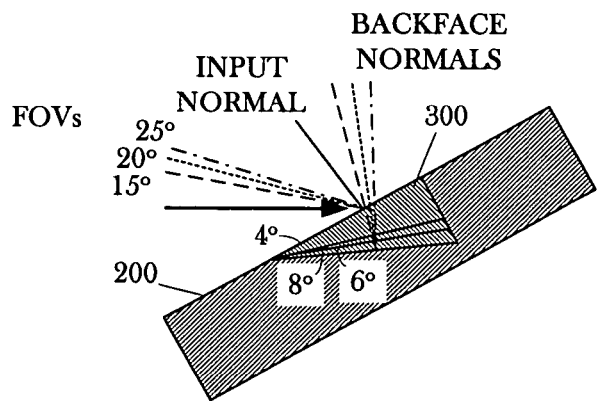
FIG. 23
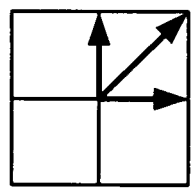   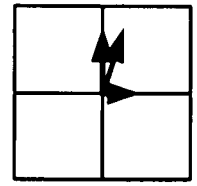
FIG. 24A      FIG. 24B

EVANESCENT WAVE COUPLING FOR FRESNEL DIRECTION FINDING

BACKGROUND OF THE INVENTION

1. Field of the Invention

The present invention pertains to optical remote sensing systems, and, more particularly, to an evanescent wave-coupling used for Fresnel direction finding in such systems.

2. Description of the Related Art

LADAR and other laser guided airborne systems have historically used hemispherical radomes at their front end. The hemispherical shape was chosen to accommodate certain optical characteristics in the operation of the guidance systems. While increasing the performance of the guidance systems, they hampered the overall performance of the airborne system. One significant drawback to hemispherical radomes is that they create high levels of drag, which inhibit the speed of the airborne system. This is particularly undesirable in a military context because it renders the airborne system more vulnerable to enemy fire, thereby decreasing its survivability, and reduces lethality.

Efforts therefore were directed at developing new techniques that would accommodate the use of sleek, low drag radomes fostering speedier airborne systems. One technique developed as a part of this effort was non-coherent Fresnel direction finding ("NCFDF"). See, e.g., U.S. Pat. No. 6,851,645, entitled "Non-Coherent Fresnel Direction Finding Method and Apparatus", issued Feb. 9, 2005, to Lockheed Martin Corporation as assignee of the inventors Brett A. Williams, et al. This technique ably accommodates the use of sleek radomes.

At the same time, some in the art have been pushing to decrease the size of such systems to obtain smaller, smarter, guided airborne systems. Desires for smaller guided projectiles, for instance, have produced pressure on sensors to fit within ever smaller dimensions. Opportunities for what may be termed "micro-missiles" such as darts or bullet-like projectiles in the neighborhood of 0.25" diameters, or less, increase these strenuous demands still further.

While requirements for optical seekers conforming to sleek, high speed radomes vs. high drag, low speed hemispherical domes typically used by semi active laser ("SAL") resulted in NCFDF with its independent, radially distributed windows and photodetectors, NCFDF begins to suffer for miniature missiles due to shrinking real-estate available for its window apertures and their associated lengths. The NCFDF apparatus in the patent mentioned above, for instance, uses a window/light-pipe design. The walls of the light-pipe are curved, reducing light rejection compared to straight walls. The aperture of the window collects light over its surface while the pipe simply guides light to its exit by multiple reflections. No focused, phase-front sensitive optics is required and wall reflection is most efficacious for total internal reflection without reflective coatings.

Light rejection and window field-of-view depend on a relation between aperture and light pipe length—that is, the aperture must be proportional to that length to avoid ever increasing reflection angles within the light-pipe until ultimately they are rejected back out to free space. If length limits are imposed, thus reducing allowable aperture dimensions, then additional apertures can be added which can satisfy the length relation for a smaller aperture/multi-window approach, increasing aperture area by the number of added windows. Yet micro-missiles have virtually no length allowance and even spacious airframes may have existing components in conflict with light-pipe placement.

The present invention is directed to resolving, or at least reducing, one or all of the problems mentioned above.

SUMMARY OF THE INVENTION

The present invention, in its various aspects and embodiments, includes a method and apparatus employing evanescent wave-couple windowing system to receive incident radiation. More particularly, in a first aspect, an apparatus comprises a radome and an evanescent wave-coupled windowing system in the radome. In a second aspect, the invention includes an evanescent wave-coupled windowing system, comprising: a pair of evanescent wave coupled prisms; and a waveguide for receiving evanescent waves output by the prisms responsive to incident radiation. In a third aspect, the invention includes an apparatus, comprising a radome; an evanescent wave-coupled windowing system in the radome; a platform body to which the radome is affixed; and a plurality of electronics housed in the apparatus, receiving a plurality of evanescent waves emitted from the windowing system responsive to incident radiation, and non-coherent, Fresnel direction finding an object reflecting the incident radiation. In a fourth aspect, a method, comprises receiving radiation reflected from an object that is incident upon a windowing system; emitting evanescent waves from the windowing system whose amplitudes are proportional to the angle of incidence of the radiation; and non-coherent, Fresnel direction finding the object.

BRIEF DESCRIPTION OF THE DRAWINGS

The invention may be understood by reference to the following description taken in conjunction with the accompanying drawings, in which like reference numerals identify like elements, and in which:

FIG. 22 illustrates detection range;

FIG. 23 illustrates input prism angle effects on field of view.

FIG. 24A, FIG. 24B illustrate E-field vector sum of TE and TM, respectively, on photodiode.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
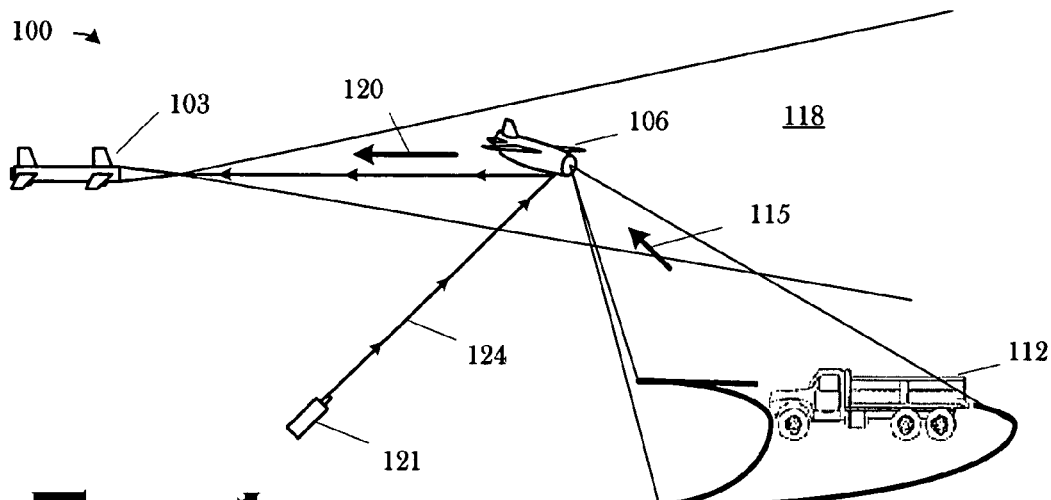
FIG. 1 conceptually illustrates one particular scenario in which a platform may employ the present invention to determine position of a target in the presence of countermeasures or other obstacles.

FIG. 1 illustrates one particular scenario 100 in which a platform 103 may employ the present invention to determine the position of a target 106. In the scenario 100, the target 106 is an aircraft surveilling the truck 112, as indicated by the arrow 115. The platform 103 is a missile seeking to kill the target 106. The platform 103 remotely senses the content of a field of view 118, as indicated by the arrow 120, in which the target 106 is located.

The embodiment illustrated in FIG. 1 is a semi-active LADAR system. A source 121 designates the target 106 as the target of interest for the platform 103 by pointing a laser signal 124 at the target 106. The laser signal 124 is reflected by the target 106 to the platform 103. Thus, a bandwidth of interest for the platform 103 is known a priori, i.e., a bandwidth centered on the frequency of the laser signal 124. In various alternative embodiments, the received energy may be in any of several bands, including—but not limited to—the visible, ultraviolet ("UV"), near infrared ("NIR"), medium-wavelength infrared ("MWIR") and long-wavelength infrared ("LWIR") bands, whether these wavelengths originate from laser designation or by virtue of radiation emitted by thermally hot targets.

Figure 2A:
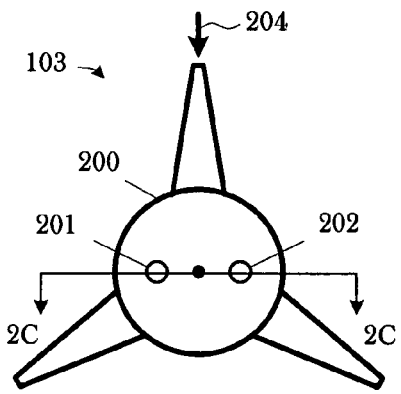
FIG. 2A-FIG. 2C depict one particular implementation of the platform in FIG. 1 in plan, head-on and partially sectioned side views, respectively, the view in FIG. 2C being taken along the line 2C-2C in FIG. 2A.
Figure 2C:
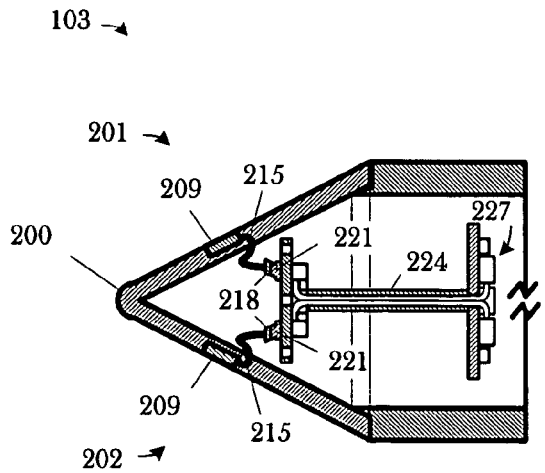
Figure 2B:
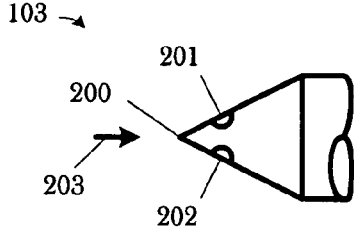

FIG. 2A-FIG. 2C depict selected portions of one particular implementation of the platform 103 in FIG. 1 in plan, head-on (indicated by the arrow 203, in FIG. 2B); plan, bird's-eye (indicated by the arrow 204 in FIG. 2A); and partially sectioned, side views, respectively. The view in FIG. 2C is taken along the line 2C-2C in FIG. 2A. As previously mentioned, the platform 103 is a missile in the illustrated embodiment. The forward end of the platform 103 comprises a radome 200, in which a plurality of optical channels 201-202 are situated.

The radome 200 is preferably sleek (e.g., a von Karman or an Ogive radome), as in the illustrated embodiment, but may be a blunt radome (e.g., a semi-spherical or hemispherical radome) in some embodiments. The optical channels 201-202 are spaced equidistantly about the perimeter of the radome 200. Note that the invention admits variation in the number of optical channels, so long as there are at least two. Each of the optical channels 201-202 further includes in this particular embodiment a window 209, a waveguide 215, a bandpass filter 218, and a detector 221.

The windows 209 are fabricated from a material that transmits the incident radiation, typically a laser pulse, but can also withstand applicable environmental conditions. In the illustrated embodiment, one important environmental condition is aerodynamic heating due to the velocity of the platform 103. Another important environmental condition for the illustrated embodiment is abrasion, such as that caused by dust or sand impacting the windows 209 at a high velocity. Thus, for the illustrated embodiment, fused silica is a highly desirable material for the windows 209. Alternative embodiments may employ ZnSe, Ah03, Ge, quartz, fused quartz, and glass.

As is best shown in FIG. 2A, each of the optical channels 201-202 in this particular window includes a separate, dedicated window 209. The construction of the windows 209 is conceptually illustrated in FIG. 3A. The window 209 comprises a pair of evanescent wave-coupled prisms 300, 301. Radiation, represented by the arrow 303, incident on the prism 300 excites a plurality of waves transmitted into the medium of the prism 300, represented by the arrows 305 (only one indicated) inside the prism 300. Some of these reflected waves, represented by the arrows 305 and 307 (only one indicated) are not captured, and escape. Once the incident angle of light on the back face 304 of the input prism 300 represented by transmitted radiation 305 meets or exceed the mediums' critical angle, no light propagates past this boundary into the gap 312 separating the prisms 300, 301 from each other. The medium's critical angle is defined as the angle at which light is totally internally reflected from the boundary between a high to low index medium.

However, upon traditional total internal reflection well described by classical optics, where no light is allowed to pass the boundary, quantum mechanics does allow photons to penetrate the boundary in the form of exponentially decaying evanescent waves 309. If a dielectric intrudes into this nanometer region occupied by the low index gap 312 then the evanescent wave 309 will be frustrated, meaning that photons will tunnel through the low index gap 312 and dielectric boundaries of both prisms 300 and 301 bounding the low index gap 312. Having tunneled, the photons are converted from "virtual photons" to propagating photons in the output prism 301, i.e., the waves 313. Thus, the prisms 300, 301 are evanescent wave-coupled in that evanescent waves 309 generated in the gap 312 pass through the gap 312, appearing in the second prism 301. More technically, the electromagnetic waves 305 in the first, input prism 300 are converted to evanescent waves 309 as they pass through the gap 312 and are converted back into the electromagnetic waves 313 in the second, output prism 301 that then propagate through the waveguide 215'.

Figure 3A:
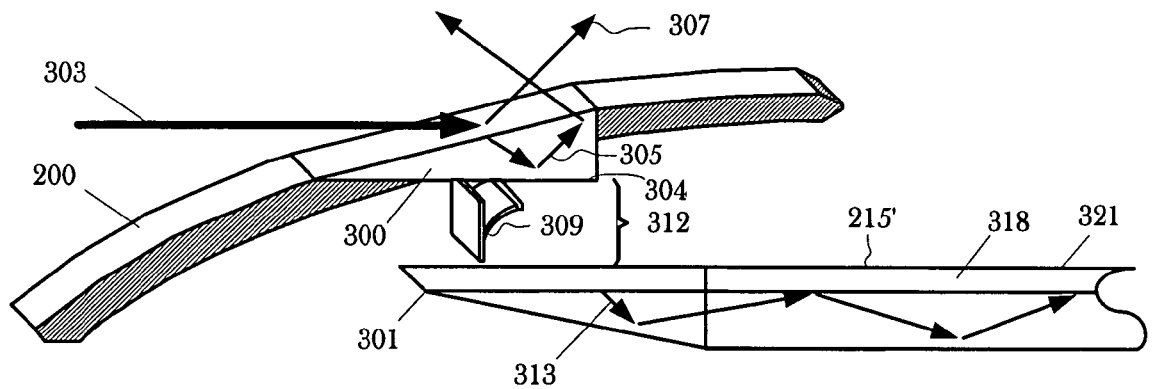
FIG. 3A and FIG. 3B illustrate the evanescent wave coupling effect employed by the present invention in a partially sectioned, perspective and a sectioned, plan view, respectively.
Figure 3B:
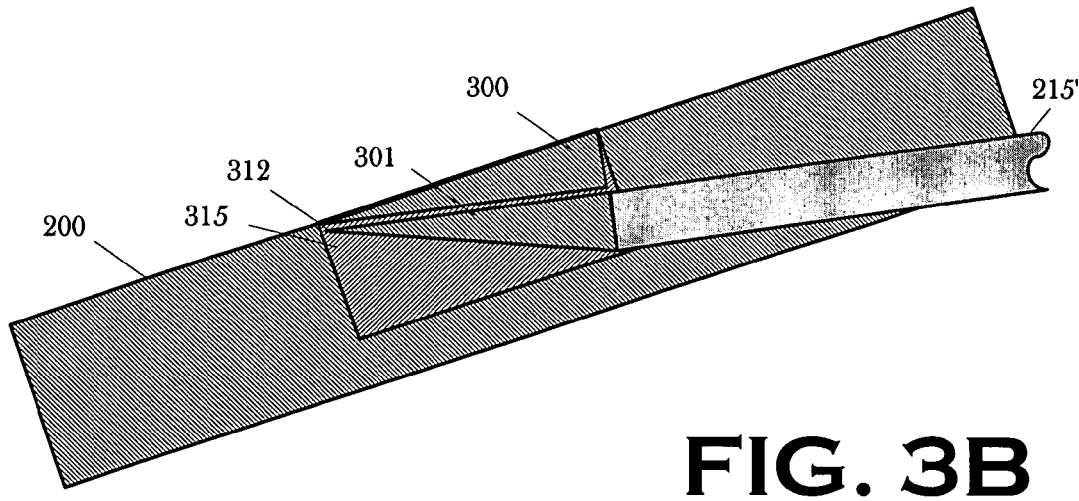

FIG. 3B depicts a window 209 as implemented in the illustrated embodiment. The two evanescent wave-coupled prisms 300, 301 are potted in a bonding agent 315 that is transparent to the incident radiation 303. The bonding agent 315 is also the fluid filling the gap 312 between the two prisms 300, 301. (Note that, in some alternative embodiments, the fluid may be a gas, e.g., air from the ambient atmosphere.) Thus, it has an index of refraction less than that of prisms 300, 301. The waveguide 215' is also bonded to the second prism 301 using a different bonding agent 315 with an index matching that of prism 301. The use of the bonding agent 200 in this manner provides structural stability to the windowing system by bonding the prisms 300, 301 not only to each other, but to the radome 200. However, the invention admits wide variation in implementation of the fluid filling the gap 312. Some embodiments, for instance, might employ air.

Figure 4A:
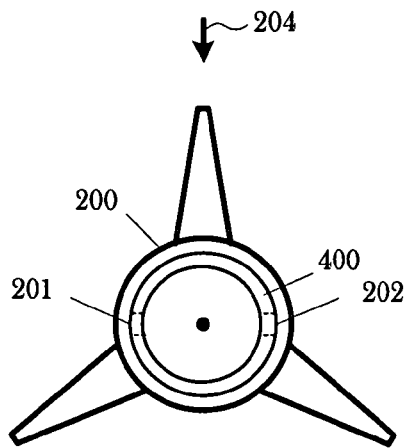
FIG. 4A-FIG. 4B depict a second particular implementation of the platform in FIG. 1 in plan, head-on and plan, "bird's eye" views, respectively.
Figure 4B:
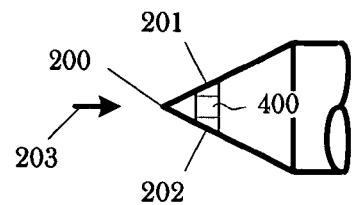

Depending upon a number of factors, including shape of the radome 200, strength of the window materials, manufacturability, and cost, it may be preferable to implement the windows 209 collectively as a collar extending around the perimeter of the radome 200. Thus, the windows 209 comprise a windowing system that, in alternative embodiments, may be implemented in a collar, such as the collar 400 shown in FIG. 4A-FIG. 4B. Thus, the windows 209 actually comprise a windowing system and are but one example of a means for windowing the radome 200. Other windowing systems may employ other windowing means, e.g., the collar 400, in alternative embodiments.

The waveguide 215' directs the evanescent waves 305, shown in FIG. 1, to the detector 221 in this particular embodiment. Note that the waveguide 215' is optional, and may be omitted in some embodiments. In the illustrated embodiment, as is best shown in FIG. 3A and FIG. 3B, the waveguide 215' is a rectangular, slab waveguide. Suitable alternative waveguide forms are available, including planar waveguides, dielectric waveguide slabs, buried channel waveguides, strip-loaded waveguides, ridge waveguides, rib waveguides, and diffused waveguides. Coaxial cables may also be used. Note that this list is neither exhaustive nor exclusive.

Figure 3C:
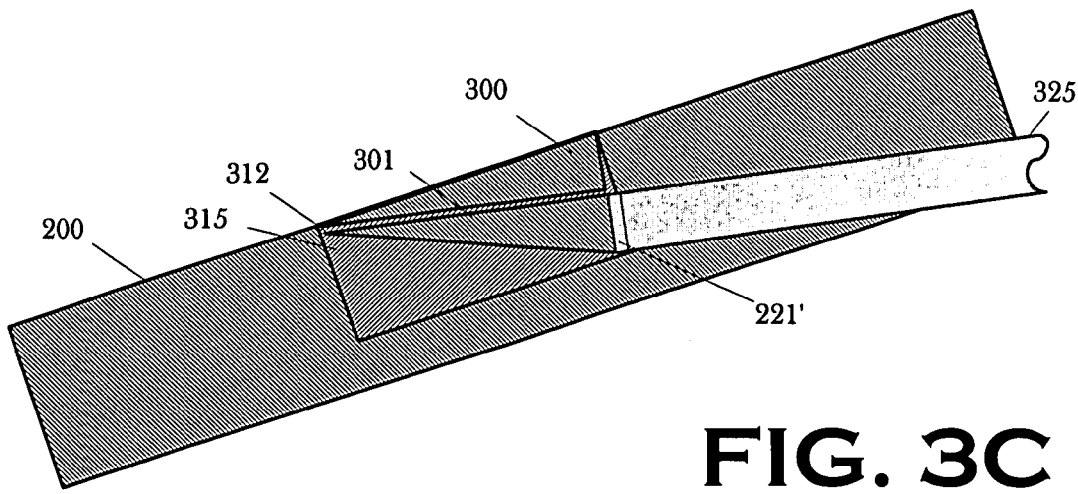
FIG. 3C illustrates an alternative embodiment omitting the waveguide of the embodiment in FIG. 3A and FIG. 3B.

As was noted above, the waveguide 215 may be omitted from some embodiments. For instance, the evanescent waves 309 coupled by the windowing system may be input directly to the detectors 221 in some embodiments. Consider the embodiment of FIG. 3C, in which a detector 221' is implemented in a 0.87 mm×1.5 mm photodiode integrated circuit described more fully in Jurgen Leeb, "Silicon Photodiode Integrated Circuits Ready For Mass Market Applications", Photonics Spectra, August 2005, pg. 78-82. Thus, instead of the waveguide 215, the embodiment of FIG. 3C provides an electrical (or optical) lead 325 by which the signal output by the detector 221' may be transmitted as described below. The detectors 221' may be bonded to the prism 301 and the lead 325 to the detector 221' using the bonding material 315 or some other suitable material or technique.

Returning now to FIG. 2C, with respect to the radiation detectors 221, they should be mechanically robust to withstand vibrations and stresses encountered during launch and operation of the platform 103. The radiation detectors 221 absorb the received radiation and, thus, selection of the radiation detector 221 depends upon the wavelength of the received radiation. Furthermore, it may be desirable for the radiation detectors 221 to respond to very short durations of the received radiation. Photodetectors comprised of semiconductor material typically meet these requirements and thus are the preferred radiation detectors 221.

Figure 5:
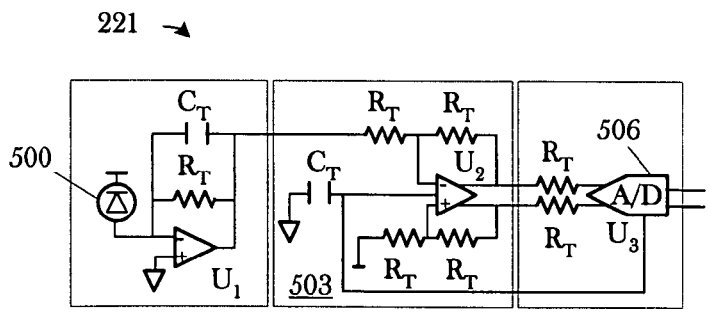
FIG. 5 is a circuit diagram schematically illustrating the function of the detectors of the implementation of FIG. 2A-FIG. 2B.

In the illustrated embodiment, the detectors 221 comprise silicon PIN photodetectors such as are well known in the art. Each Silicon PIN photodetector represents a single pixel, such that the output of the detectors 221 in the illustrated embodiment is not useful for imaging. However, alternative embodiments may employ alternative detectors that may yield information that may be imaged. FIG. 5 depicts a schematic for an individual detector 221. Each detector 221 detects the radiation received through the respective optical channel 201-202 with a diode 500, amplifies it in an amplification stage 503, and either passes this as a voltage or current to a processor or converts it to digital with an analog-to-digital ("A/D") converter 506.

Another method of reducing the noise of the guidance system is to use a radiation filter 218. The filter 218, placed in front of the radiation detector 221, blocks a portion of the radiation incident thereon. The radiation filter 218 is preferably a bandpass filter. The bandpass filters 218 are also optional, and help to limit the radiation bandwidth permitted, reducing noise and the potential of jamming sources within a wider detector bandwidth. (Note that the evanescent waves are only between the two prisms in the gap, once in the output prism 301 they are real electromagnetic waves again, and so standard conditioning techniques are applicable.) The method of constructing such a bandpass filter is well known in the art and thus a discussion of the design and construction of a bandpass filter is omitted here. The bandpass filter would transmit radiation within a given wavelength range, while blocking substantially all other radiation. By designing the bandpass filter to transmit radiation of the same wavelength used in the received radiation, the radiation filter 218 would block radiation pulses of different wavelengths, perhaps resulting from countermeasures and/or background radiation.

Figure 6:
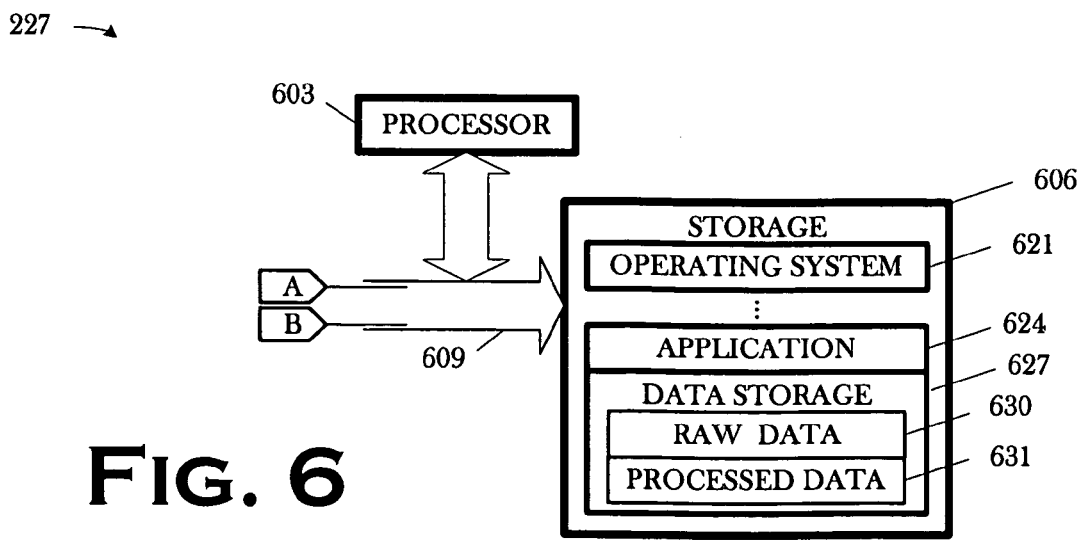
FIG. 6 depicts, in a block diagram, selected portions of the electronics of the implementation of FIG. 2A-FIG. 2C.

Still referring to FIG. 2C, the detectors 221 are electrically connected through a wiring harness 224 to a plurality of electronics 227 that capture, store, and process the information output by the detectors 221. FIG. 6 depicts, in a conceptualized block diagram, selected portions of the electronics 227 with which certain aspects of the present invention may be implemented. The electronics 227 include a processor 603 communicating with some storage 606 over a bus system 609. In general, the electronics 227 will handle lots of data in relatively short time frames. Thus, some kinds of processors are more desirable than others for implementing the processor 605 than others. For instance, a digital signal processor ("DSP") may be more desirable for the illustrated embodiment than will be a general purpose microprocessor. In some embodiments, the processor 603 may be implemented as a processor set, such as a microprocessor with a math co-processor.

The storage 606 may be implemented in conventional fashion and may include a variety of types of storage, such as a hard disk and/or random access memory ("RAM") and/or removable storage such as a magnetic disk (not shown) or an optical disk (also not shown). The storage 606 will typically involve both read-only and writable memory. The storage 606 will typically be implemented in magnetic media (e.g., magnetic tape or magnetic disk), although other types of media may be employed in some embodiments (e.g., optical disk). The present invention admits wide latitude in implementation of the storage 606 in various embodiments. In the illustrated embodiment, the storage 606 is implemented in RAM and in cache.

The storage 606 is encoded with an operating system 621. The processor 603 runs under the control of the operating system 621, which may be practically any operating system known to the art. The storage 606 is also encoded with an application 642 in accordance with the present invention. The application 624 is invoked by the processor 603 under the control of the operating system 621. The application 624, when executed by the processor 603, performs the non-coherent Fresnel direction finding and, in some embodiments, ranging, One suitable ranging technique is disclosed and claimed in the context of a passive systems readily adaptable also to semi-active and active systems in U.S. application Ser. No. 11/103,380, entitled "Instantaneous Passive Range Finding," filed Apr. 11, 2005, in the name of the inventors Wayne K. Scroeder and Brett A. Williams and commonly assigned herewith. This reference is hereby incorporated by reference as if set expressly set forth verbatim herein for its teachings regarding range finding, now U.S. Pat. No. 7,292,179.

The storage 606 includes a data storage 627, which, in the illustrated embodiment, comprises at least two data structures storing raw and processed data 630-631, respectively. The data structures in which the data 630-631 are stored may be any suitable data structure known to the art. In the illustrated embodiment, the detectors 221 convert the analog radiation received through the optical channels 201-202 into digital data. The inputs A-B in FIG. 6 represent the digital output of the detectors 221 for the optical channels 201-202.

The raw data 630 is typically buffered long enough for the processing to take place and then overwritten. The processed data 631 is typically also buffered, the amount of time depending on its use. In some embodiments, the raw data may be telemetered to another location for processing. Similarly, in some embodiments, the processed data may be telemetered to another location for various reasons. Typically, however, the processed data 631 is consumed aboard the platform 103.

Thus, in operation, the incident radiation 303, shown in FIG. 3A, impinges upon the first prism 300. In the illustrated embodiment, the incident radiation 303 is the reflection of the signal 124, shown in FIG. 1, originating from a third party, remote laser designator 121. Returning to FIG. 3A, this excites evanescent waves 309, as described above, in the low index gap 312. Some of the evanescent waves 309 appear across the gap 312 into the second prism 301, which is therefore evanescent wave-coupled to the first prism 300. The evanescent waves 309 are then converted into propagating electromagnetic waves 313 in the output prism 301. The electromagnetic waves 313 then propagate through the waveguide 215, shown in both FIG. 2C and FIG. 3A, to the detector 221 after being filtered by the filters 218. The detectors 221 convert the propagating waves 313 to digital raw data 630, shown in FIG. 6, which is then stored and processed by the electronics 227, shown in both FIG. 2C and FIG. 6. The raw data 630 can then be processed for non-coherent, Fresnel direction finding by the electronics 227 to yield the processed data 631.

The present invention combines the evanescent wave-coupled windowing system discussed above with a non-coherent Fresnel direction finding ("NCFDF") technique first disclosed and claimed in U.S. Pat. No. 6,851,645, entitled "Non-Coherent Fresnel Direction Finding Method and Apparatus", issued Feb. 9, 2005, to Lockheed Martin Corporation as assignee of the inventors Brett A. Williams, et al. ("the '645 patent). This patent is hereby incorporated by reference as if set forth herein verbatim for its teachings regarding NCFDF.

The present invention uses Fresnel transmission amplitudes resulting in monopulse angles as exploited by NCFDF. However, evanescent wave coupling collects light through a significantly smaller package and resides on or within the radome surface as conceptualized in FIG. 3A and FIG. 3B without the window/light-pipe intrusion of the apparatus in the '645 patent. This allows for utility of this seeker system in micro-missiles as well as less obtrusive optics for those existing missile systems with components occupying internal radome space that would otherwise disallow use of NCFDF.

As was previously mentioned, the scenario 100, illustrated in FIG. 1, involves a semi-active system employed by the platform 103, i.e., it operates off radiation generated by an external, off-board source 121 designating the target 106. However, the present invention may be also employed, with some modification, to both passive and active systems, as well. Note that, for a passive system, performance will be degraded to some degree relative to a semi-active or active system. For a passive system, the hardware of the embodiments in FIG. 4A-FIG. 4C needs no modification other than in selection of components and the angles of the prisms 300, 301 since passive systems tend to operate on radiation of different wavelengths than do semi-active systems. However, the hallmark of an active system is an on-board laser, and so some hardware modification will be needed.

Figure 7A:
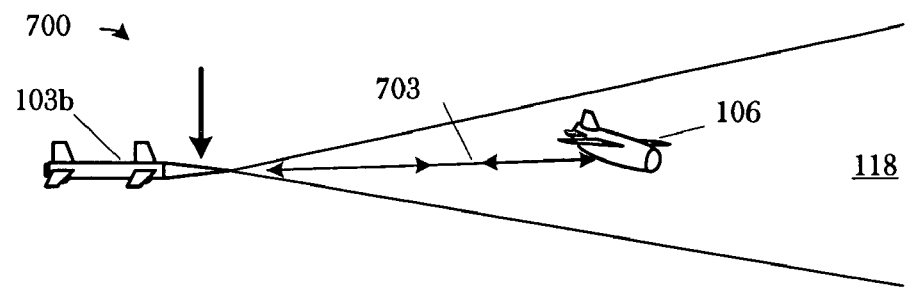
FIG. 7A-FIG. 7C illustrate an embodiment in which the present invention is employed in an active system.
Figure 7B:
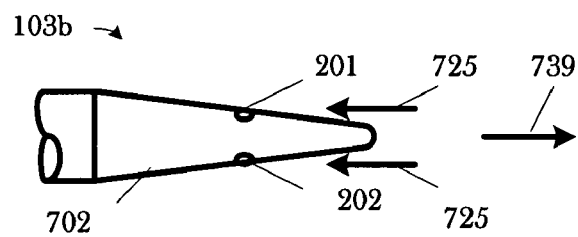
Figure 7C:
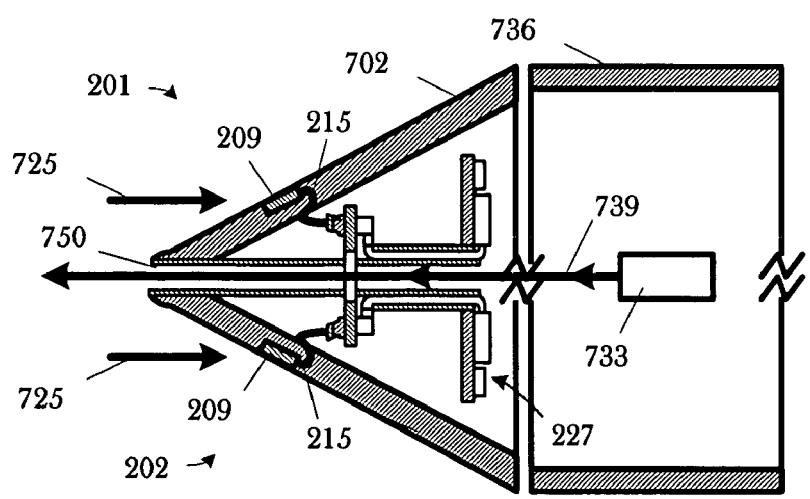

FIG. 7A-FIG. 7C illustrate an embodiment in which the present invention is employed in an active system. FIG. 7A illustrates an active system scenario 700, in which the platform 103b transmits an optical signal 201 and receives the reflection 725 from the target 106. FIG. 7C depicts one particular implementation of the forward end of the platform 103b in a partially sectioned, side view. FIG. 7C illustrates the construction and operation of exemplary optical channels 201, 202 in conjunction with an optical source 709. The platform 103b comprises a radome 712, in which the optical channels 201, 202 are situated.

In general, the optical channels 201, 202 are constructed and operate as discussed above. The platform 103b also includes an optical source 733, housed in the fuselage 736. Note that, in some embodiments, the optical source 733 may be housed in the radome 712. Note also that alternative embodiments may use other bands of radiation. In the illustrated embodiment, the optical source is a laser, such as are well known and commonly used in the LADAR arts, and particularly a fiber laser. The optical source 733 generates a signal 739 that is transmitted from the platform 103b out the aperture 750.

Still other variations may be implemented in the hardware of the platform 103. For instance, while the description to this point has assumed a single element in each photodetector 221, this is not required. If each photodetector 221 actually comprises two or more individual detector elements (not shown), additional noise reduction is possible. For example, by summing the signals from each individual detector element, the noise in the signal from one detector element will partially cancel the noise in the signal from another detector element. When two or more individual detector elements form each photodetector 221, it is preferable to focus the radiation across all of the individual detector elements such that each is approximately equally illuminated by the radiation.

Now, to further an understanding of the invention, a proof of concept will be disclosed. The discussion of evanescent wave coupling assumes a familiarity with NCFDF disclosed in the '645 patent incorporated above, including the underlying notion of Fresnel transmittance. Accordingly, the following discussion opens with a brief summary of the Fresnel transmittance and NCFDF excerpted from the '645 patent before moving on to evanescent wave coupling.

Figure 8A:
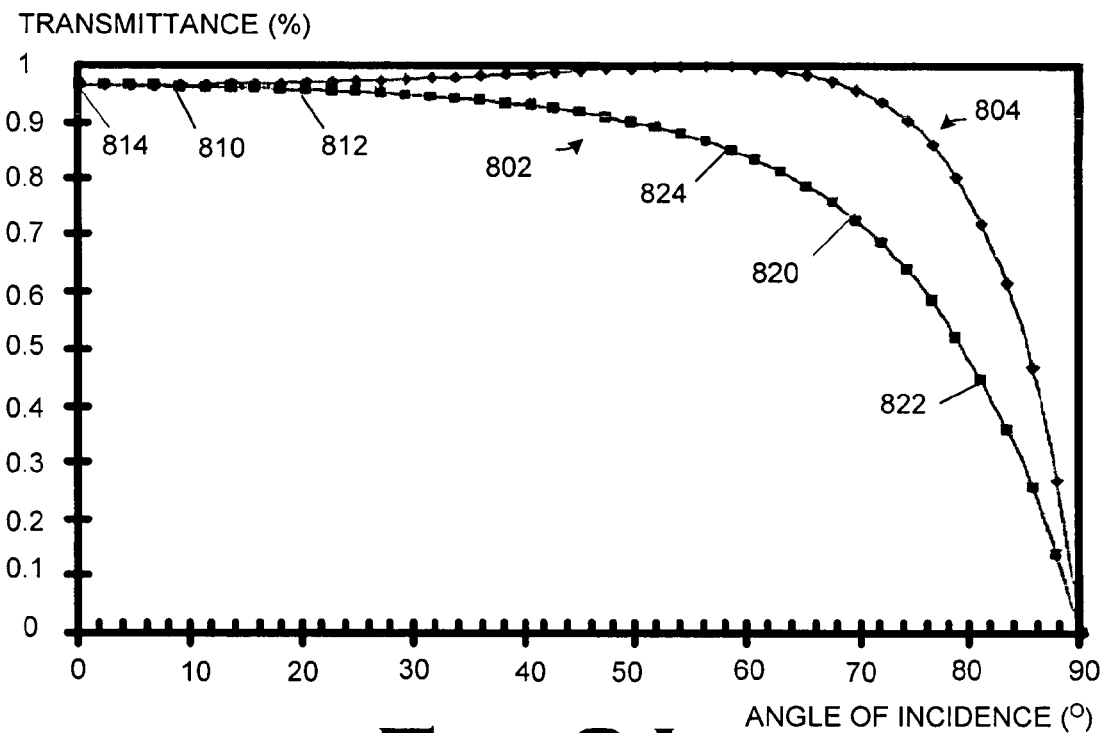
FIG. 8A-FIG. 8B illustrate the relationship between angle of incidence and transmission of radiation impinging on the windows of the radome shown in FIG. 2A-FIG. 2C.

As seen in FIG. 8A, the transmittance of radiation, as a percentage, through an air/fused silica interface is a strong function of both incidence angle and polarization based upon Fresnel's equations:

$$t_s = 2n_i \cos(\theta_i)/[n_i \cos(\theta_i) + n_t \cos(\theta_t)], \text{ and} \quad (1)$$

$$t_p = 2n_i \cos(\theta_i)/[n_i \cos(\theta_t) + n_t \cos(\theta_i)]. \quad (2)$$

In Fresnel's equations, Eq. 1 and Eq. 2, $t_s$ corresponds to the transmittance for S-polarized (perpendicular) radiation and $t_p$ corresponds to the transmittance for P-polarized (parallel) radiation. $\theta_i$ and $\theta_t$ correspond to the angles of incidence and transmission, respectively. Lastly, $n_i$ and $n_t$ correspond to the indices of refraction for the incident and transmitted materials, respectively. This dependence of the transmittance upon the angle of incidence shall be defined as Fresnel transmittance.

Curve 802 approximates the Fresnel transmittance $t_s$ for radiation incident upon the air/fused silica interface, while curve 804 approximates the Fresnel transmittance $t_p$. At low angles, such as point 810 at 10°, corresponding to a blunt or hemispherical radome, Fresnel transmittance is not a strong function of angle at all. More specifically, for an incident angle of 10°, radiation received within an angle of +10° (point 812) to −10° (point 814) shows virtually no difference in Fresnel transmittance, regardless of polarization. In other words, the instantaneous rate of change of the Fresnel transmittance as a function of angle of incidence at 10° is approximately zero. In contrast, an incident angle of 70° (point 820), corresponding to a relative sleek radome, shows significant differences in Fresnel transmittance for angles ±10°. In other words, the instantaneous rate of change of the Fresnel transmittance as a function of angle of incidence at 70° is significantly different from zero, i.e., the Fresnel transmittance is rapidly changing as a function of angle of incidence. For an incident angle of 70°, radiation received within an angle of +10° (point 822, 45% transmittance) to −10° (point 824, 85% transmittance) shows a difference in Fresnel transmittance of 40% for S-polarization radiation.

Figure 8B:
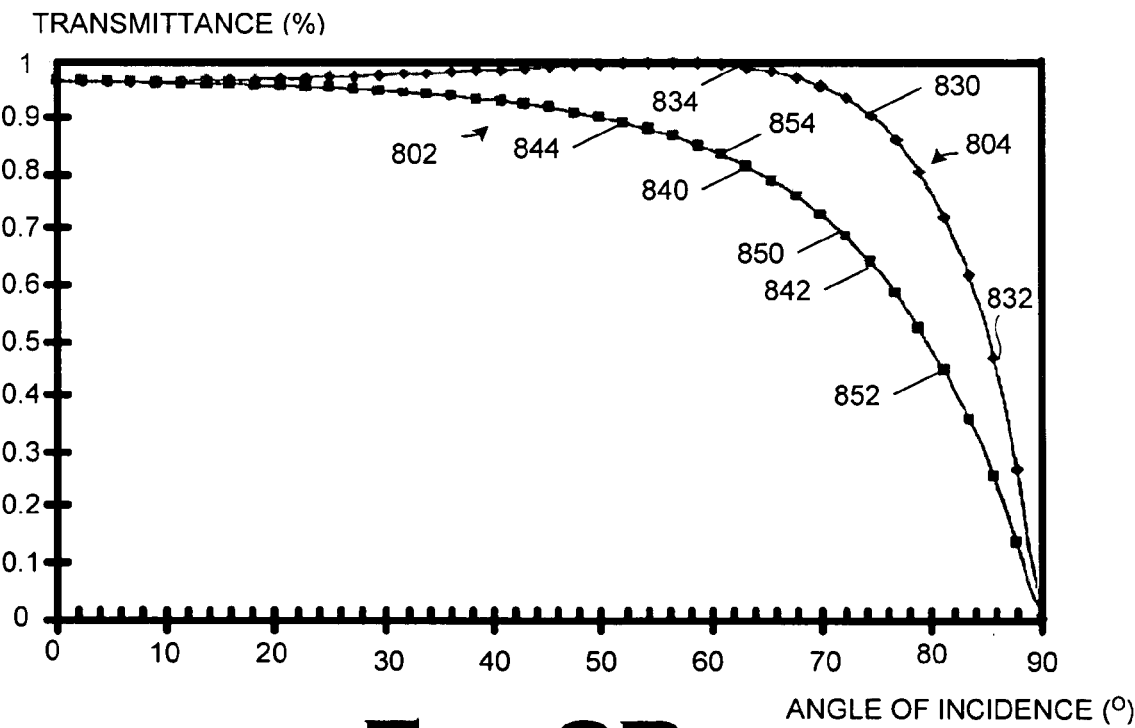

Specifying a middle field of view transmittance is an alternative method for defining a direction finding system design and is illustrated in FIG. 8B. For example, for a middle field of view Fresnel transmittance of 90% for P-polarized radiation (point 830), a ±10° field of view provides a change in Fresnel transmittance of approximately 50% (points 832 and 834). A middle field of view Fresnel transmittance of 80% for S-polarized radiation (point 840) provides a change in Fresnel transmittance of approximately 25% (points 842 and 844) over the ±10° field of view. A middle field of view Fresnel transmittance of 70% would be preferable for the S-polarized radiation (point 850) as the ±10° field of view change in Fresnel transmittance increases to 40% (points 852 and 854). Because of this continuous or smooth variation in Fresnel transmittance as a function of incidence angle, even a single radiation detector can provide some indication of the angle of incidence if properly calibrated. However, at least three radiation detectors are preferred to provide the level of control desired for a precision guided munitions traveling at a high velocity.

Thus a sleek radome system benefiting from the Fresnel transmittance has a greater angular sensitivity than a blunt or hemispherical radome system. To benefit from the Fresnel transmittance, the incidence angle should be selected such that the Fresnel transmittance of the radiation varies significantly over the desired field of view, i.e., the slope of the Fresnel transmittance is significantly difference from zero. The above example employed a field of view of ±10° and a fused silica-based material for the windows 209. Under these conditions, a minimum angle of incidence at boresight of at least approximately 60° is preferred, with at least approximately 60° being more preferred. The maximum incidence angle is approximately 80° when a ±10° field of view is required.

Note that these minimum and maximum incidence angles are a function of the window material and the field of view. Narrower fields of view will require greater minimum angles to ensure that the Fresnel transmittance varies significantly over the desired field of view. Based upon Fresnel's equations, Eq. (1) and Eq. (2), different indices of refraction will change the shape of the Fresnel transmittance curve, and thus the minimum angle of incidence. For example, $Al_2O_3$ has a greater index of refraction than fused silica, and therefore would require a smaller minimum angle of incidence. One of skill in the art will appreciate that these and other system parameters, including detector sensitivity, will determine how great the instantaneous rate of change of the Fresnel transmittance as a function of angle of incidence would need to be to achieve a required angle sensitivity.

Now, moving on to the evanescent wave coupling, the evanescent field is a result of violating a condition in classical optics in which an incident ray equal to or exceeding the critical angle of incidence from a high to low refractive index results in total internal reflection ("TIR"). Evanescent fields actually penetrate the boundary though no power is passed (unless they are "frustrated"). A mathematical nuance of Maxwell's equations it is also a contradiction since no propagating electromagnetic wave behaves in such a manner as to penetrate an interface while traveling nowhere and falling off exponentially to zero, nor does a static field suffice as the disturbance is traveling along that interface.

However, a satisfactory description is provided by quantum mechanical photon tunneling. Through tunneling the evanescent field is instead seen as a wave function or probability density distribution at the boundary (like that of electron tunneling in a potential well) where a photon can then be picked out of the evanescent field once "frustrated" with some likelihood established by this distribution if the sampling medium penetrates quantum dimensions. While not adequately describing what physically happens, Maxwell's equations do provide a means of calculating how much energy is available in the evanescent field for frustration.

More technically, to describe the fields at a dielectric boundary we need the boundary conditions at that interface as provided by the integral form of Maxwell's curl equations in a source free region (J=0).

$$\oint_C E \cdot ldl = -\partial/\partial t \oint_S \int B \cdot n dS \quad (3)$$

$$\oint_C H \cdot ldl = \partial/\partial t \oint_S \int D \cdot n dS \quad (4)$$

Where the closed line integral is the usual enclosure around an increment of the interface including an elemental surface dS with n the normal to that surface. The result is that the tangential components of our E and H fields must be continuous across the material boundary.

Adopting k-space as a way to look at this interface—where k is the usual wave-vector and k the wave-number of $2\pi n/\lambda$, where n is the refractive index, $\lambda$ the wavelength—that for either side of this boundary the k's must "phase match". Or, in other words, their geometric projections on the interface must be equal. As set forth in Donald L. Lee, "Electromagnetic Principles Of Integrated Optics", p. 51 (Jon Wiley & Sons, 1986), consider a plane wave incident on a material boundary between two different refractive indices—positive x is up, positive z is right and positive y toward the reader out of the page—then the three vector fields of incident, reflected and transmitted waves can be written as:

$$E_i(r) = A_i e^{-j(k_i \cdot r)} \quad (5)$$

$$E_r(r) = A_r e^{-j(k_r \cdot r)} \quad (6)$$

$$E_t(r) = A_t e^{-j(k_t \cdot r)} \quad (7)$$

Where "·" is the vector dot product such that $k \cdot r = k_x r_x + k_y r_y + k_z r_z$. Since tangential components must be continuous across the boundary this implies:

$$[A_i e^{-j(k_{iy} y + k_{iz} z)} + A_r e^{-j(k_{ry} y + k_{rz} z)}] \tan = [A_t e^{-j(k_{ty} y + k_{tz} z)}] \tan \quad (8)$$

Where the wave nature of each is reflected by the Euler formula of $e^{j\theta} = \cos\theta + j\sin\theta$. $A_{i,r,t}$ represents the field magnitude of incident, reflected and transmitted E-fields and the k's are the tangential k-component for each over the yz-plane. This leads to the so-called "phase-matching" requirements in k-space of $$k_{iy} = k_{ry} = k_{ty} \equiv k_y \quad (9)$$

$$k_{iz} = k_{rz} = k_{tz} \equiv k_z \quad (10)$$

Figure 9:
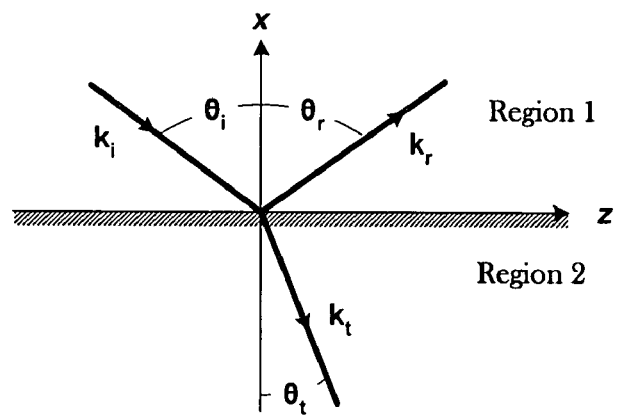
FIG. 9 illustrates assorted incident plane, vector & angle definitions.

Physically this means each lies in the same plane and they all match graphically at the interface. This also allows simplification by ignoring one dimension (y) to only consider the plane of incidence—the x-z-plane—and the interface in that plane as shown in FIG. 9. Now each k vector is defined in terms of its component in x and z with unit vectors for each axis as (positive x up, positive z right):

$$k_i = -x k_{ix} + z k_{iz} \quad (11)$$

$$k_r = x k_{rx} + z k_{rz} \quad (12)$$

$$k_t = -x k_{tx} + z k_{tz} \quad (13)$$

Figure 10:
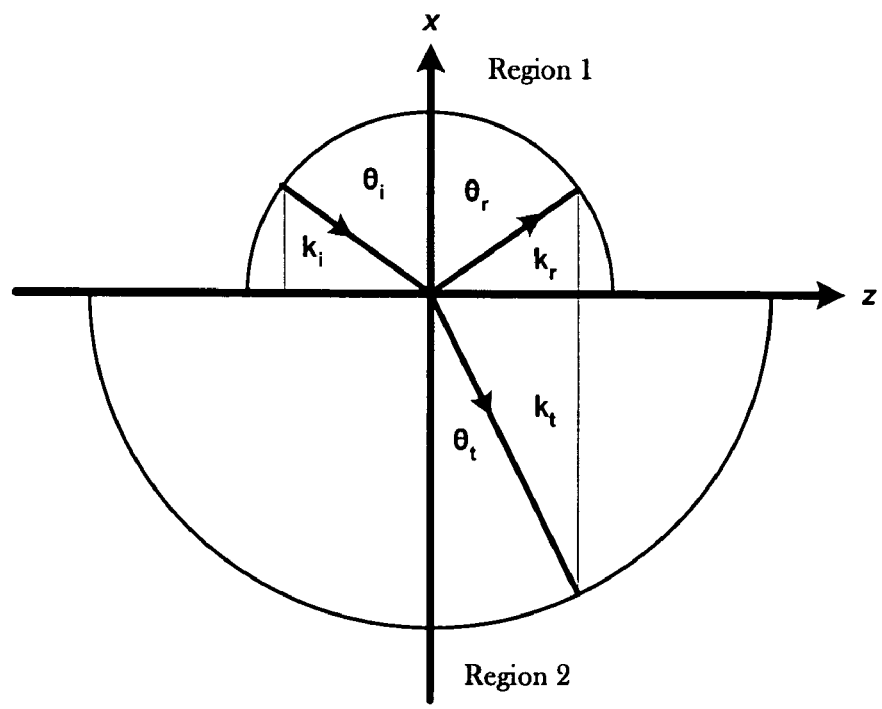
FIG. 10 illustrates k-Space, $n_1 < n_2$.

The projections of each k by sin and cosine can be easily seen from the drawing.

$$k_{ix} = k_1 \cos\theta_i, k_{iz} = k_1 \sin\theta_i \quad (14)$$

$$k_{rx} = k_1 \cos\theta_r, k_{rz} = k_1 \sin\theta_r \quad (15)$$

$$k_{tx} = k_2 \cos\theta_t, k_{tz} = k_2 \sin\theta_t \quad (16)$$

where $k_1$ & $k_2$ are k for their medium. Given that Maxwell's boundary conditions require continuous tangential components across that boundary, and that k is the same for both incident and reflected, this then means $\theta_i$ and $\theta_r$ must be the same and that $$k_1 \sin\theta_i = k_2 \sin\theta_t \quad (17)$$

which is Snell's Law derived from Maxwell's phase matching. Additionally if we note that waves in both region 1 & 2 must satisfy the following dispersion relations $$k_1 = \sqrt{k_{ix}^2 + k_{iz}^2} \quad (18)$$

$$k_2 = \sqrt{k_{tx}^2 + k_{tz}^2} \quad (19)$$

which are equations for a circle, then we can graphically display what happens in k-space when $k_1 < k_2$ ($n_1 < n_2$) as shown in FIG. 10. Since the z-components of all k's are equal by Maxwell's requirement and $n_1 < n_2$ then the magnitude of $k_2$ ($2\pi n_2/\lambda$) (also $k_t$ in the figure) is greater than $k_1$ and each traces out a half-circle in their region as shown.

Figure 11A:
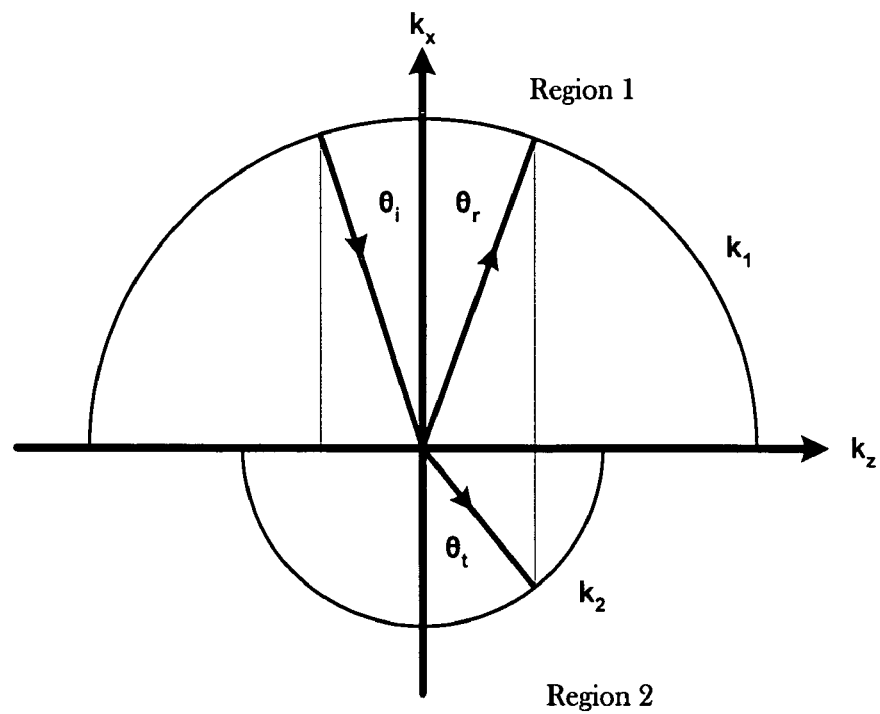
FIG. 11A and FIG. 11B illustrate k-Space, $n_1 > n_2$ and critical angle.
Figure 11B:
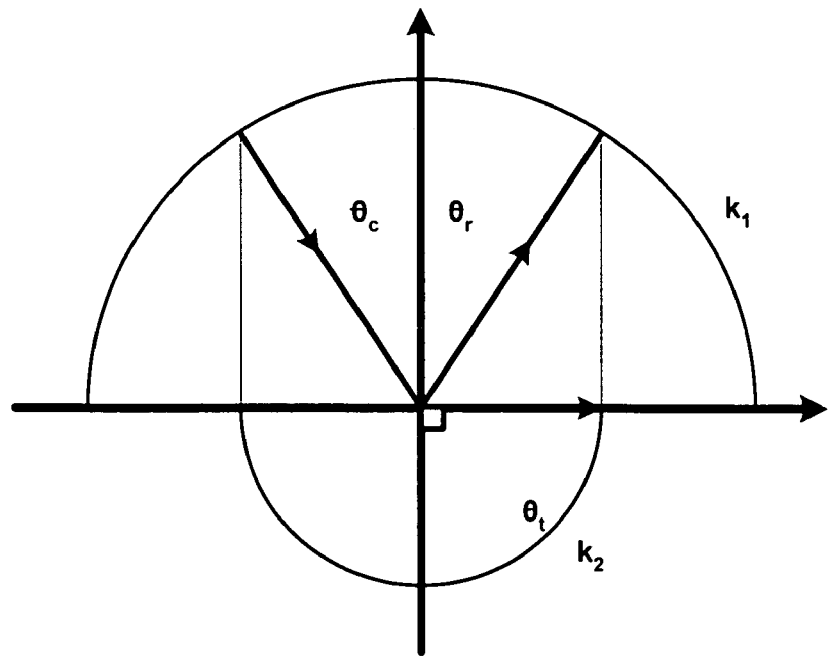

Consider the case where $n_1 > n_2$, as shown in FIG. 11A and FIG. 11B. Note that $k_1$ exceeds the length of $k_2$ at and after the critical angle $\theta_c$ where $\theta_t = 90°$. Finally we can ask what happens to k when $\theta_i > \theta_c$ with $n_1 > n_2$, which answered from the classical optics standpoint is, nothing. From the dispersion relation in Eq. (19) above, solving for $k_{tx}$ one gets, $$k_{tx} = \sqrt{k_2^2 - k_{tz}^2} \quad (20)$$

Because of Maxwell's phase matching $k_{tz} = k_1 \sin\theta_i$ (projection of $k_1$ on z-axis) so that $$k_{tx} = \sqrt{k_2^2 - k_1^2 \sin\theta_i^2} \quad (21)$$

Note that $k_1 \sin\theta_i = k_2$ at $\theta_c$ (FIG. 11B, because $\theta_r$ substitutes for $\theta_i$ given they're equal). If $k_1 \sin\theta_i > k_2$ then the square root is negative and $k_t$ becomes imaginary.

$$k_{tx} = \pm j \sqrt{k_1^2 \sin\theta_i^2 - k_2^2} \equiv \pm j\alpha_{tx} \quad (22)$$

From Eq. (8) above we see the wave variation in region 2 is of the form (here along the x-axis), $$e^{jk_{tx} x} = e^{j(\pm j\alpha_{tx})x} = e^{\pm \alpha_{tx} x} \quad (23)$$

Since physically this function must not go to infinity when x goes to $-\infty$ the last term on the right is made to satisfy this by a choice of positive sign in Eq. (23) and $$k_{tx} = -j\alpha_{tx} \text{ when } \theta_i > \theta_c. \quad (24)$$

Figure 12:
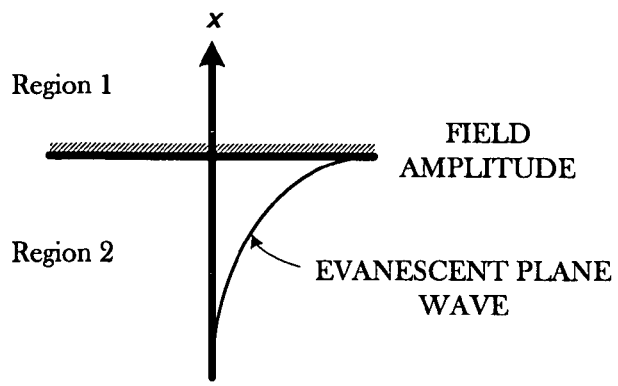
FIG. 12 illustrates evanescent wave amplitude.

At last we see the field fall off exponentially with distance from the interface as shown in FIG. 12 once $\theta_i > \theta_c$ where TIR takes place.

Figure 13:
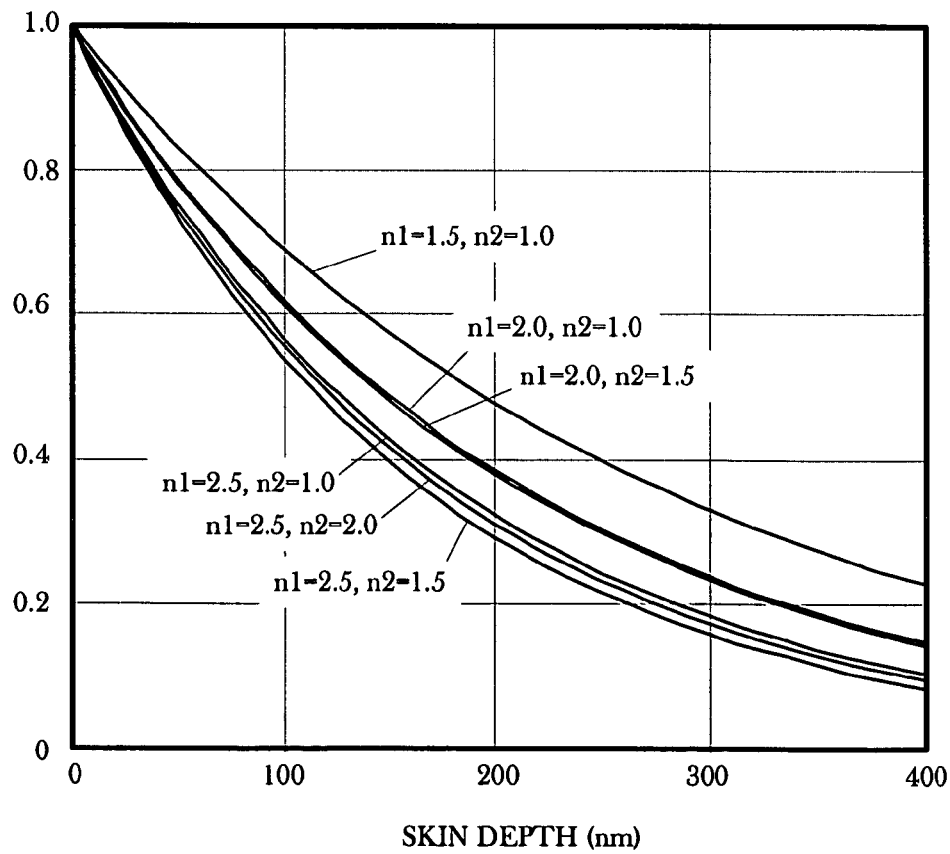
FIG. 13 illustrates evanescent decay vs. "skin depth" for a fixed incidence and different prism-pair indexes.

FIG. 13 plots evanescent wave penetration versus variations in index of refraction between the two prisms with a fixed incident angle of $\theta_c$ plus an arbitrary 10°. The greatest amplitude is that for n1=1.5 and n2=1.0 (n1~ fused silica, while n2~air) while when n1=2.5 and n2=1.5 the amplitude falls off fastest. The unexpected result is that the approximate trend is to find evanescent waves making maximum penetration not when the index differences are the greatest but when they are least, though absolute index seems to matter. The large index pair with a small relative index difference (n1=2.5, n2=2.0, diff=20%) is the poorest performer, while the small index pair with a small relative index difference (n1=1.5, n2=1.0, diff=33%) performs the best.

Figure 14:
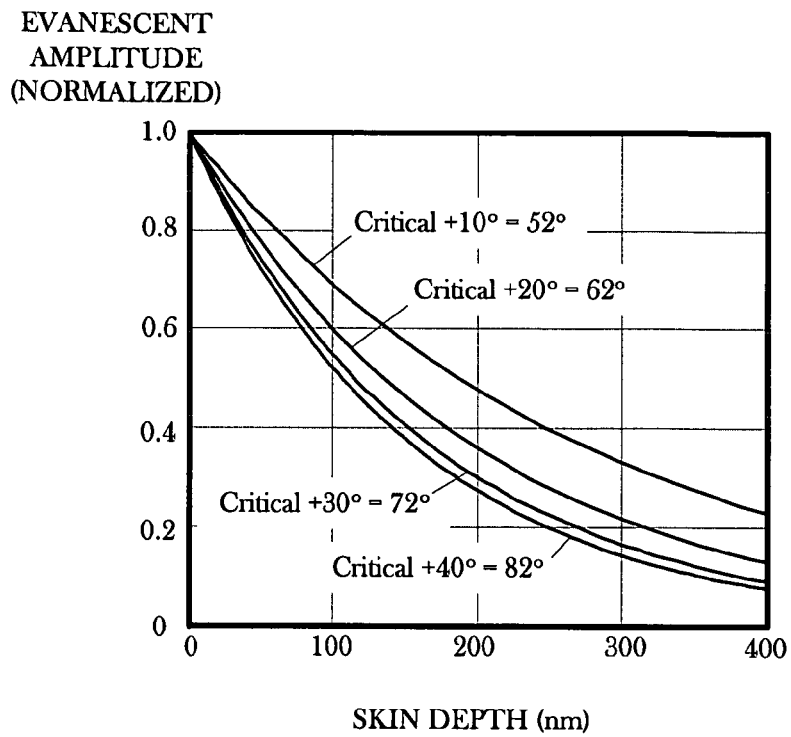
FIG. 14 illustrates evanescent decay vs. "skin depth" for a varied incidence with fixed indices of $n_1=1.5$, $n_2=1.0$.
Figure 15:
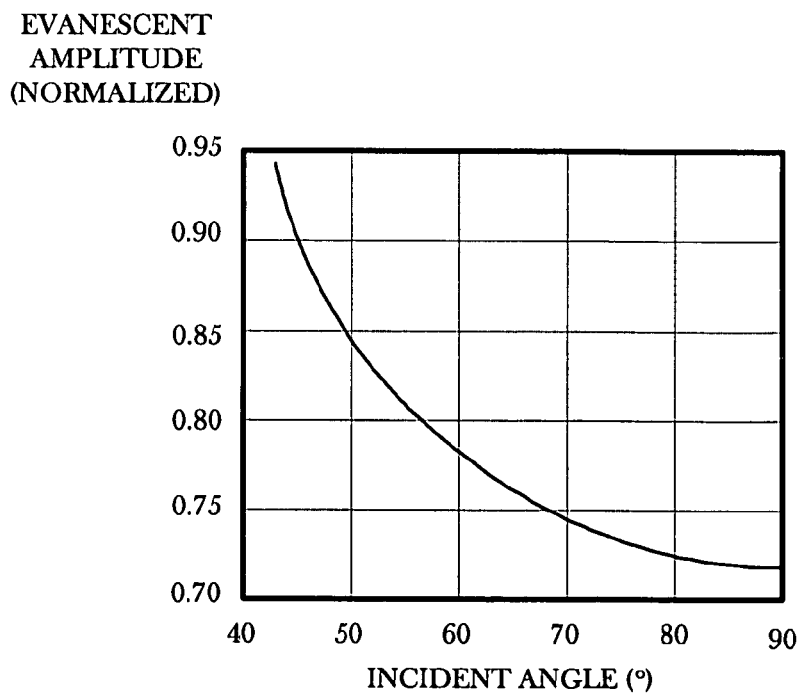
FIG. 15 illustrates evanescent falloff with increasing incident angle past critical for fixed skin depth=50 nm.

Next we look at what happens for a fixed index pair (n1=1.5, n2=1.0) with varied incidence angle past the critical. In FIG. 14 the wave behaves as though more energy is transferred to the reflected field as incidence increases, however, all propagating energy is already in the reflected beam once $\theta_i > \theta_c$. In FIG. 15 skin depth is fixed at 50 nm (n1=1.5, n2=1.0) while incidence varies from 1° beyond critical of ~42° at the interface to 90°. FIG. 15 shows a reduction in amplitude with increasing incidence following the trend found in both Fresnel transmission, and widow foreshortening resulting from the projection of a circular window into an ellipse when rotated about an axis through its plane and viewed from the forward direction (as on a radome). All three act in the same direction and manner—reduced amplitude with increased incidence, thus increasing accuracy through steeper beta slope at the expense of received power and therefore reduced detection range.

The evanescent field will combine with Fresnel and window foreshortening but to find out how much requires the addition of one more component—that is, whatever samples the evanescent field and by what means. Dielectric waveguide slabs, separated from the input prism by a low density (or air) gap are an option as long as internal waveguide modes are satisfied by the input prism and mode coupling is quantized. Tapered fiber optics and micro-disks with prism couplers are also options but instead we choose a second output prism-like structure that essentially acts again as a light pipe. This then delivers power to either a photodiode directly or to a fiber that will carry light to a photodiode anywhere in the missile body at essentially zero loss—as long as the fiber's numerical aperture is satisfied (i.e., a cone angle of acceptance) resulting in TIR internal to the fiber else suffering leakage.

The fiber numerical aperture can be tuned by suitable cladding index choice to produce fiber field-of-view angle cut offs similar to physical baffling. Here we assume a photodiode attached to our output optic. A suitable silicon photodiode ("PD") integrated circuit with preamp and voltage up-converter as a size suitable option is disclosed in Jurgen Leeb, "Silicon Photodiode Integrated Circuits Ready For Mass Market Applications", Photonics Spectra, August 2005, pg. 78-82. The means of delivering energy to a diode like this will be frustrated total internal reflection by a second output prism.

Figure 16:
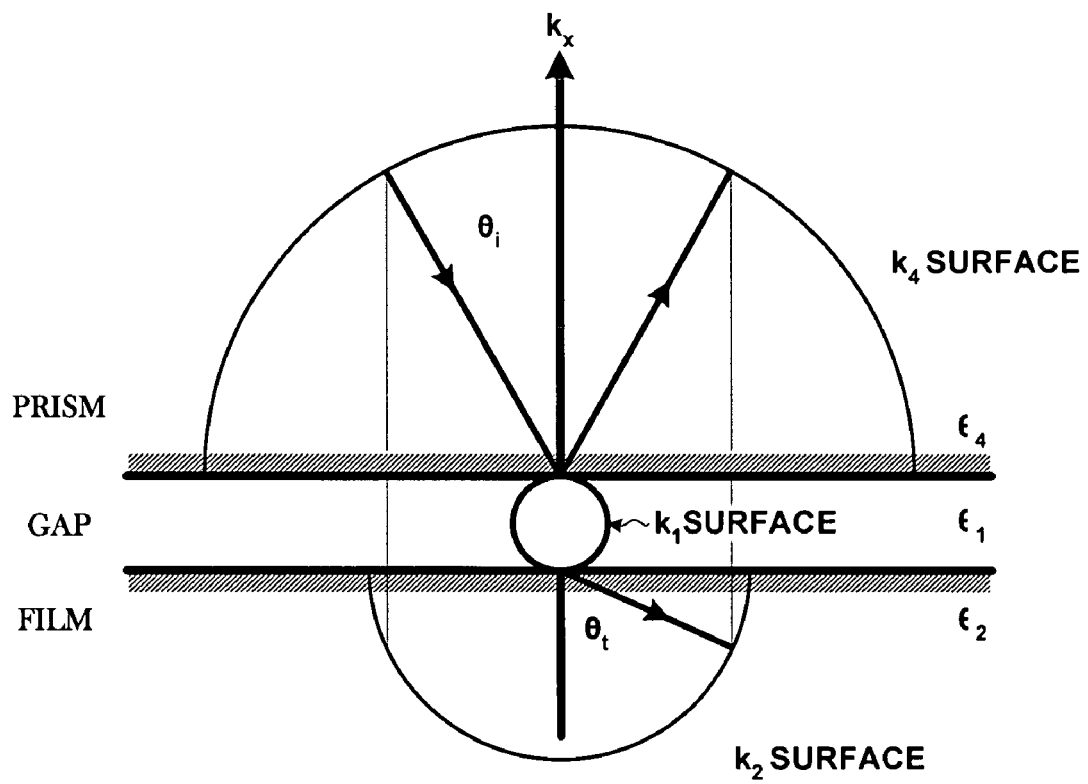
FIG. 16 illustrates k-space and media designations across gap.

To frustrate the evanescent wave we must intrude into its space in order to create real photons from this virtual field just beyond the TIR boundary. Through a ray summation technique, see Lee, pg. 147, and a geometric method of phase variation over gaps between media, see Lee, pg. 90, we can calculate the transmission coefficient for a beam of light passed—via the evanescent wave—to a second media (our output prism) across a gap between them, $$T = \frac{T_{41} T_{12} e_{1x^g}^{-\alpha}}{1 - R_{14} R_{12} e_{1x^g}^{-2\alpha}}, \text{ for } \theta_i > \theta_c \tag{25}$$

where the T and R coefficients are different for TE and TM polarization and the media subscripts are associated with the media as shown in FIG. 16.

The power transmission coefficient, or transmissivity through the gap is represented by a coefficient of time-averaged power through the gap as $$t^{TE} = \frac{k_{2x}|T^{TE}|^2}{k_{4x}} \tag{26}$$

$$t^{TM} = \frac{\varepsilon_4 k_{2x}|T^{TM}|^2}{\varepsilon_2 k_{4x}} \tag{27}$$

where epsilons are the dielectric constant related to the index of refraction by $\sqrt{\varepsilon} = n$.

From the transmission and reflection coefficients for TE and TM polarization, assuming magnetic permeability is equal for all materials involved, see Lee, p. 660, we get $$R^{TE} = [1 - (k_{tx}/k_{ix})]/[1 + (k_{tx}/k_{ix})] \tag{28}$$

$$T^{TE} = 2/[1 + (k_{tx}/k_{ix})] \tag{29}$$

$$R^{TM} = [1 - (\varepsilon_1/\varepsilon_2)(k_{tx}/k_{ix})]/[1 + (\varepsilon_1/\varepsilon_2)(k_{tx}/k_{ix})] \tag{30}$$

$$T^{TM} = 2/[1 + (\varepsilon_1/\varepsilon_2)(k_{tx}/k_{ix})] \tag{31}$$

Note that $k_{ix} = k_1 \cos \theta_i$ and $k_{tx} = k_2 \cos \theta_t$. Substituting these into Eq. (28) above and recalling that $k = 2\pi n_{i,t}/\lambda$ thus these terms algebraically cancel yielding—as one example—the more familiar $R^{TE} = R^\perp = [n_i \cos \theta_i - n_t \cos \theta_t]/[n_i \cos \theta_i + n_t \cos \theta_t]$.

Then to satisfy the needs of Eq. (25) by noting the proper medium subscripts and that the $k_{tx}$ transmitted in the gap is now $j\alpha_{1x}$ then for TE mode $$T_{41} = 2/[1 - (j\alpha_{1x}/k_{4x})] \tag{32}$$

$$T_{12} = 2/[1 + (jk_{2x}/\alpha_{1x})] \tag{33}$$

We can now code Eq. (25) (transmission amplitude—i.e., as a voltage coefficient) for TE and similarly for TM modes as well as apply Eq. 26 and Eq. 27 to calculate the transmissivity (transmission amplitude squared—i.e., as a power coefficient) over incidence angle resulting from our dual-prism evanescent wave coupling system. Recall that for complex variables $|T_{41} T_{12}| = |T_{41}||T_{12}|$ and $|T_{41}/T_{12}| = |T_{41}|/|T_{12}|$ where the || sign is known as the absolute value, modulus or amplitude of the value within, where the modulus of $T_{41}$ is then $|T_{41}| = \sqrt{Ta^2 + Tb^2} = T_{41} T_{41}^*$. Lastly we use the fact that that for a complex fraction $a/(b+jc) = a(b-jc)/[(b+jc)(b-jc)]$ allowing us to convert 2.7 and 2.8 from imaginary fractions into standard complex format of a+jb.

With these in mind we find the transmission amplitude over incident angle—a combination of Fresnel transmittance, window foreshortening, and evanescent wave coupling, where received amplitude is that received by the output prism. In order to make comparisons with a standard NCFDF window we assume for the moment an existing miniature-missile application with a 3:1 Von Karman where the length L=3.75", and base D=1.25" with 7 mm diameter apertures. For this system an 80° incident angle results for a boresight ray from the target and the radome imposes this angle where the radome surface slope is 10° at missile station 1.7".

Note that in the process of developing these equations several approximations have been made allowing for manageable terms, leaving them valid in what is called the "weak transmission approximation" where gap width is made relatively large (here 200 nm). The theoretical limit of evanescent coupling efficiency has been stated by varying authors as between 80%, see Gorodetsky, M. L., et al., "Optical microsphere resonators: optimal coupling to high-Q whispering-gallery modes", 16 J Opt Soc Am B 147-154 (1999); Lee, pg.

Figure 17:
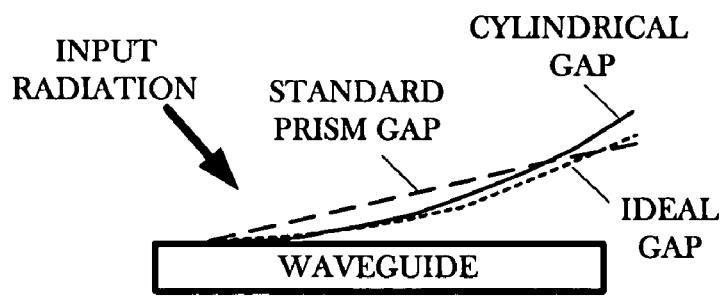
FIG. 17 illustrates an optimized prism gap.

164, and 95%, see Laine, J. P, et al, "Microsphere resonator mode characterization by pedestal anti-resonant reflective waveguide coupler", 12 IEEE Photon. Tech. Lett. (8), p. 567-569 (2000). One reference notes a theoretical coupling efficiency of 92%, see David Alan Cohen, "Lithium Niobate Microphotonic Modulators", PhD Dissertation (May 2001), for a cylindrical gap as shown in FIG. 17, though such a shape is likely to drive up cost and probably not worth the extra efficiency.

Though a positive result for detection range as shown in FIG. 22, this value is not reflected in the weak transmission approximation because the gap is intentionally widened to satisfy preceding mathematical simplifications, thus signal is intentionally attenuated. This means in order to compare evanescent wave coupling detection range with NCFDF, code used to calculate that range can only be modified by the theoretical limit as the weak approximation places undue penalties we would not implement in a built system. Before characterizing evanescent wave coupling notice the nature of NFCFD as shown in FIG. 18A-FIG. 18D and FIG. 19A-FIG. 19B below. In FIG. 18A-FIG. 18D we have effects from Fresnel transmission amplitude alone (not transmissivity). FIG. 19A-FIG. 19B shows the added effect of window foreshortening.

Figure 18A:
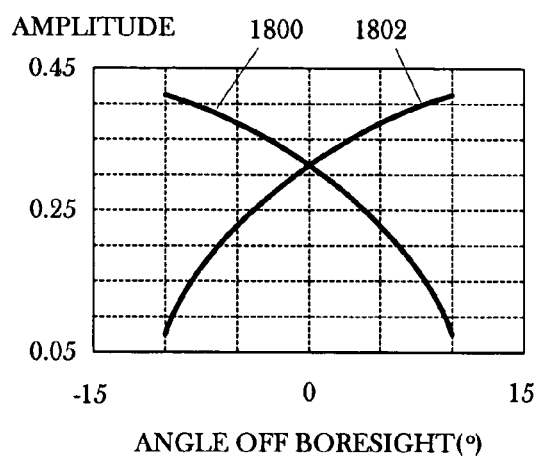
FIG. 18A-FIG. 18D illustrate the window Fresnel, sum, absolute value difference, beta curves in a NCFDF windowing system.

More particularly, FIG. 18A-FIG. 18D illustrate various signals which are generated within the direction finding system. FIG. 18A illustrates the detection signals of an opposing pair of radiation detectors, such as top and bottom radiation detectors or right and left radiation detectors. As an example, curve 1800 corresponds to the detection signal of the left radiation detector and curve 1802 corresponds to the detection signal of the right radiation detector. In this instance, the detection signal of the left radiation detector 1800 is strongest when the radiation pulse is incident at an angle to the left off boresight and continuously decreases as the radiation pulse is incident at angles increasingly to the right off boresight. This decrease in the left detection signal is due to the decreasing Fresnel transmittance as the angle of incidence increases from left off boresight to right off boresight.

Figure 18B:
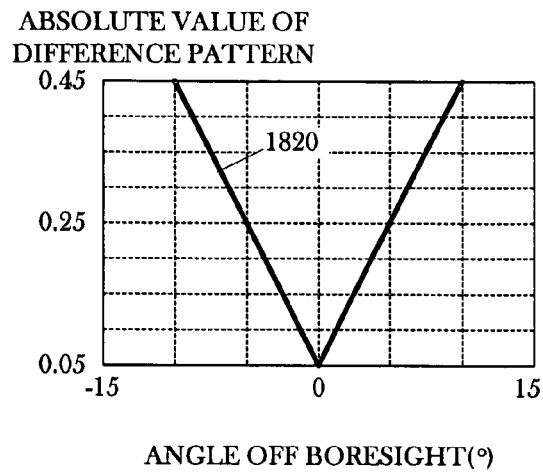
Figure 18C:
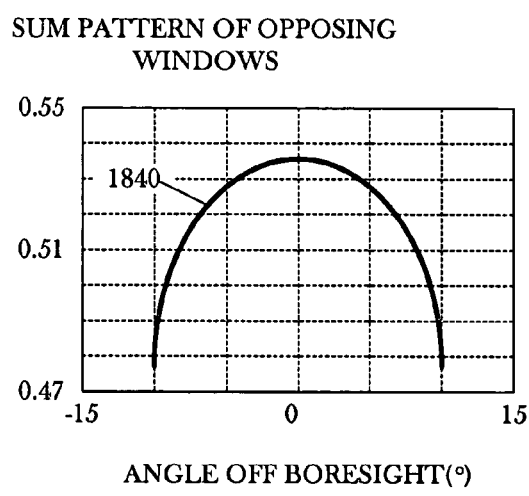
Figure 18D:
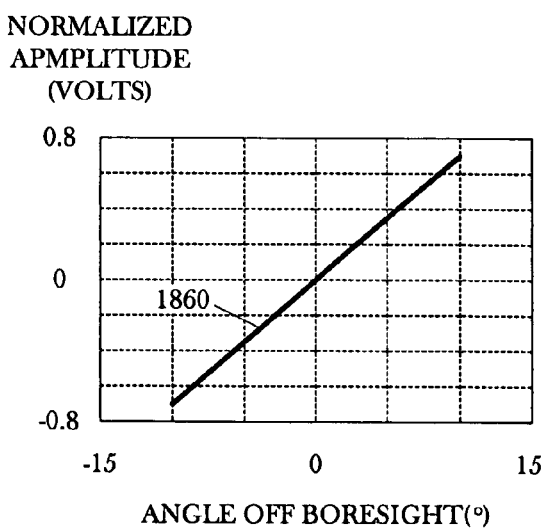
Figure 19A:
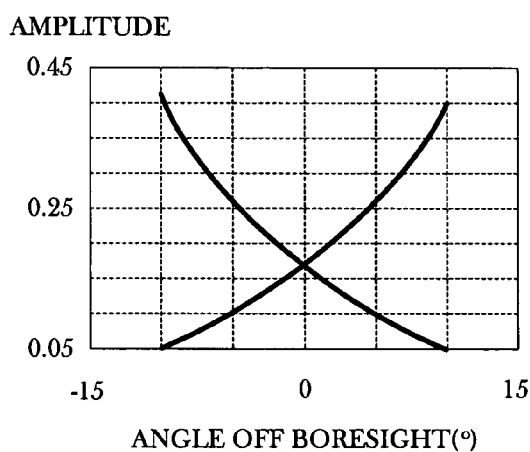
FIG. 19A-FIG. 19D illustrates window Fresnel, sum, absolute value difference, beta in a NCFDF windowing system with foreshortening.
Figure 19B:
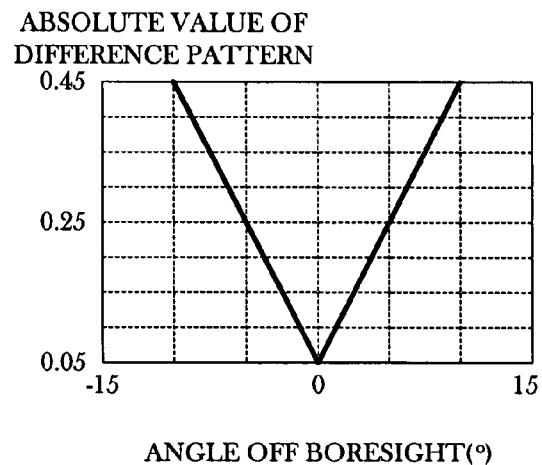
Figure 19C:
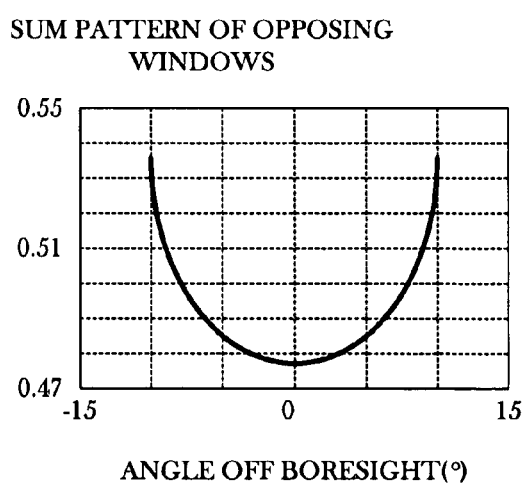
Figure 19D:
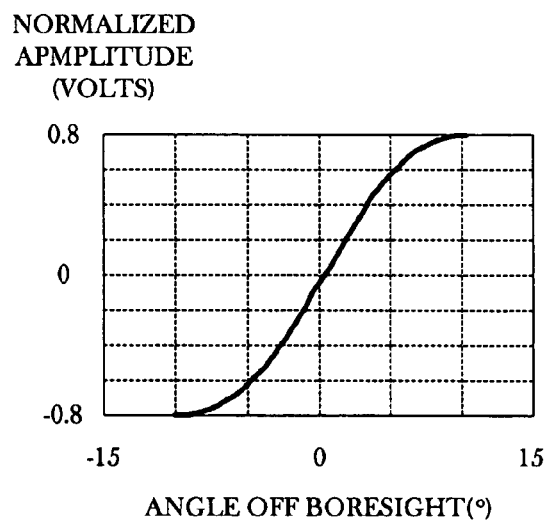

FIG. 18B illustrates the absolute value of the difference 1820 between the detection signals of the right and left radiation detectors 1800, 1802. FIG. 18C illustrates the sum 1840 of the detection signals of the right and left radiation detectors. Lastly, FIG. 18D illustrates the difference of the right and left detection signals 1820 divided by the sum of the right and left detection signals 1840, creating a beta angle error curve 1860. Guidance correction for guided munitions typically uses this beta angle error curve 1860, as is well known within the art. The signals, and all manipulations thereof, may be conducted in either the analog or the digital domain. However, the digital domain is preferred, as implementing additional signal processing, such as noise reduction, is simpler.

Figure 20A:
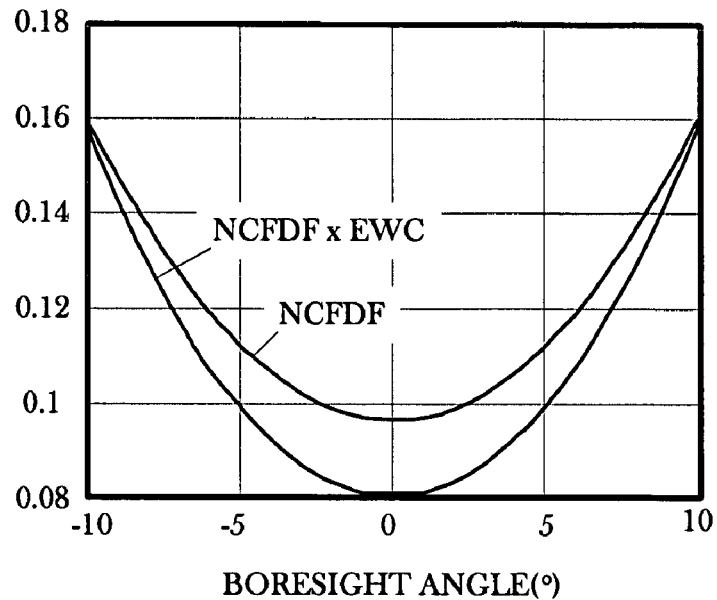
FIG. 20A-FIG. 20A illustrate sum and difference patterns, respectively, with NCFDF, window foreshortening and evanescent wave coupling.
Figure 20B:
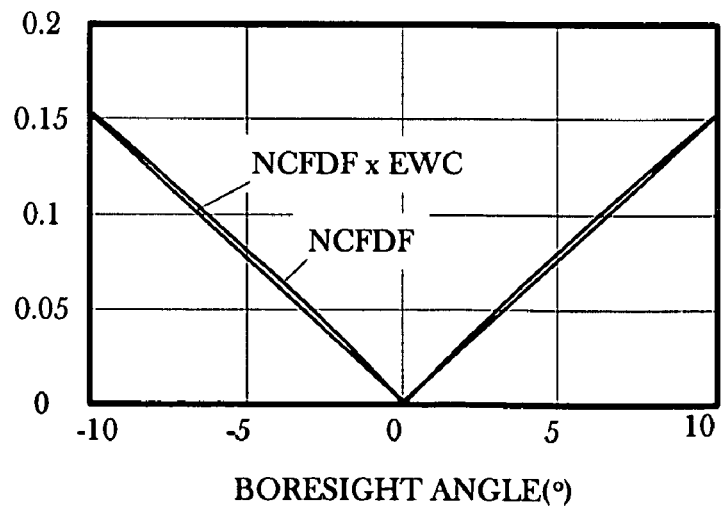
Figure 21A:
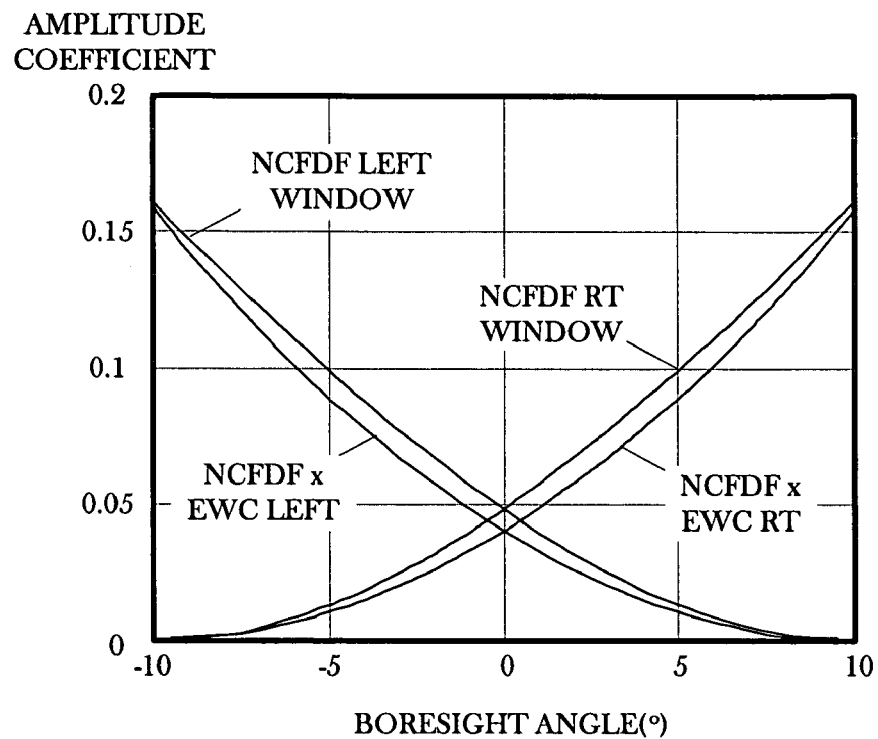
FIG. 21A-FIG. 21B illustrates window amplitudes and beta curve, respectively, with NCFDF, window foreshortening and evanescent wave coupling.
Figure 21B:
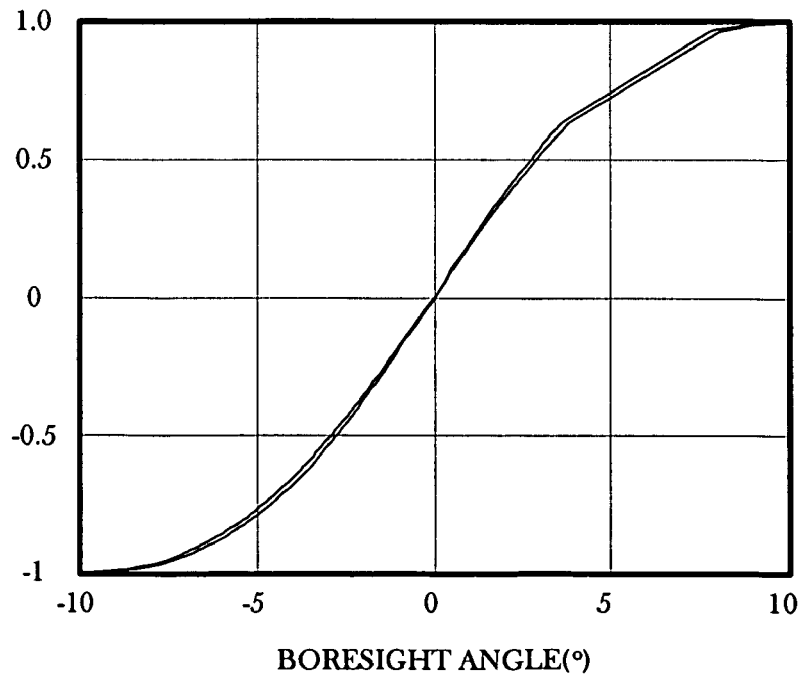

Evanescent wave coupling is an addition to the Fresnel phenomena of NCFDF and window foreshortening with their variation in amplitude over angle as shown in FIG. 20A, FIG. 20B, and FIG. 21A, FIG. 21B. This variation is communicated to the coupling mechanism as the initial transmission coefficient, where only TE is analyzed here. FIG. 20A, FIG. 20B are plots of both NCFDF with window foreshortening, and with evanescent wave coupling included. We see that while evanescent wave coupling will reduce overall transmission, the curves are almost unchanged as shown in FIG. 20A, FIG. 20B, and FIG. 21A, FIG. 21B due to the similar profile between evanescent wave coupling and NCFDF with foreshortening for a single window as shown in FIG. 15 and FIG. 19A. Current Monte Carlo simulations of standard NCFDF without evanescent wave coupling show accuracies of 0.7 mrad (though this can be improved slightly with repositioning of windows further back on radome and channel balancing via noise reductions) compared to 6" Ka-band RF antennas of ~0.5 mrad. Evanescent wave coupling—with only the slightest of improvement-results in virtually no change in accuracy from NCFDF as shown in FIG. 21B.

FIG. 22 provides detection range for a $\frac{1}{8}^{th}$ inch diameter window, ground target on boresight, with a 0.144 mrad divergence, 4.5 MW, 5 km designator in 8 km visibility haze and 23 km visibility standard clear for a Si PIN diode and 20 db gain APD at 1.06 μm using a theoretical evanescent coupling efficiency of 80%. Since evanescent wave coupling provides no gain (instead a slight loss), results are a function of aperture area. Table 1 provides approximate volumes for both the NCFDF standard window using an aperture diameter of 7 mm for both NCFDF and evanescent wave coupling—where in this case evanescent wave coupling reduces volume by a factor of ~27. Table 1 also gives volume for a dart or other munitions with a standard 0.024" shell casing assuming a $\frac{1}{8}^{th}$ inch diameter aperture and prism maximum thickness of 0.024" in both cases, or about 0.6 mm. One reference, "Lithium Niobate Microphotonic Modulators", David Alan Cohen, May 2001, PhD Dissertation, has built 0.5 mm prisms for their test set at the University Of Southern California.

TABLE 1

Volume Comparison

|  | NCFDF | Evanescent Wave Coupling |
|---|---|---|
| 17 mm (0.68") Aperture | 2400 mm 3 | 90 mm 3 |
| Dart: 0.024" Shell Casing | NA | 5 mm 3 |

Notice that the evanescent field dies when TIR stops and light can be propagated through the interface. At that point light entering the output prism—like injecting light into a fiber outside its numerical aperture—should fall off quickly through leakage. This sets a FOV limit for the chosen example in which our 10° prism at missile station 1.7" is approximately half-way back on our sample radome. We find a large evanescent wave coupling FOV of 30° away from boresight and 10° toward the nose. Moving the prism forward would increase signal strength, decrease FOV away from the nose and reduce the various contributions to accuracy.

Tuning fiber numerical aperture is another FOV management option as noted above. Preferably, simply changing the angle of our input prism back-face as shown in FIG. 23 such that a chosen outside FOV just satisfies the prism's TIR requirement allows not only optimization of signal strength but a latitude in missile station placement. Table 2 applies Snell's Law for a 1.5 index prism at MS 1.7 with $\theta_c$~42°, where greater input angles result in thicker prisms. A band-pass filter can be placed between the output prism and photodiode, though Fabry Perot versions are sensitive to input incidence angle.

TABLE 2

Approximate Outside FOY vs. Prism Angle

| Prism Angle | Outside FOV |
|---|---|
| 4° | 14° |
| 6° | 21° |
| 8° | 24° |

It has been assumed that return polarization from a complex target is random. If this were true then a vertical wire mesh polarizer would pass half the beam, as no matter what the polarization, half the total would have vertical components of the E-field, while half horizontal. If one polarization were preferred such a polarizer could be employed but frustrated TIR will couple with both TE and TM (parallel and perpendicular) and the waveguide will carry both (with some differences). Yet at the photodiode, two cross-polarized fields will add vectorially, constructively or destructively, depending on their respective polarization and phase at the interface at any given instant, as shown in FIG. 24A, FIG. 24B.

Since ideally only one polarization is transmitted from the laser source, the condition in FIG. 24A would occur if the target were responsible only for polarization rotations of 90° and all reflections remained coherent otherwise. Ground targets should present the receiver with numerous optical path length ("OPL") differences. Sequential reflections from objects perfectly along the line-of-sight ("LOS") can remain coherent with each other, depending on coupled relations of polarization, angle of incidence and reflecting material (dielectric or conductor).

But reflections divergent from perfectly along the LOS will present phase differences depending on OPL—responsible for speckle where phase differences can be seen across different locations of the scattered beam. However, since evanescent wave coupling uses the same monopulse division process as NCFDF, as long as variations in field amplitude are the same across all receiver apertures, though detection range varies, angle information will not. How much our coherent laser reflection deviates in phase and polarization—approaching natural light—has impact on the vector sum shown above, which will average over short times. Ignoring polarization, if there were no coherence upon return then every ray would be slightly out of phase with every other and the net result would attenuate reception. If all were in phase we would experience maximum coupling. (Numerically how much may be determined through experimental testing.)

It should be emphasized that "natural light" released from random atomic emissions has coherence times on the order of 3 femto-seconds for white light, 1 µs for a "stabilized He Ne" laser and 5 ms for what's listed as a "special He Ne" laser, see "Optics", Table 7.1, p. 316 (4$^{th}$ Ed. Hecht, Addison Welsey, 2002). Given that laser synthetic aperture "radar" ("SAR"), see M. Bashkansky, et al., "Two-dimensional synthetic aperture imaging in the optical domain", 27 Optics Letters 15 (2002), in work or in use and coherent lidar used for aerosol and wind speed measurements are moderately common, see, inter alia, Henderson et al., "Pulsed coherent solid-state 1.06 µm and 2.1 µm laser radar systems for remote velocity measurement" 1222 SPIE Laser Radar V (1990); "Airborne Coherent Lidar For Advanced In-Flight Measurements (ACLAIM) Flight Testing Of The Lidar Sensor", David C. Soreide, Boeing Defense & Space Group, et al, September 2000, a 2 µm sensor (available over the Internet); "Multi-Center Airborne Coherent Atmospheric Wind Sensor", Timothy Miller, Global Hydrology & Climate Center, Huntsville, Ala., 1998, a 10.6 µm sensor (available over the Internet), there is apparently adequate coherence required for these systems to measure Doppler frequency shifts with respect to their on-board phase reference (a portion of the transmit beam). Thus we assume available coherence will tend to maximize coupling for evanescent wave coupling.

An additional matter should be mentioned in regards to atmospheric perturbations, in refractive index over the propagation path caused by turbulence setting limits on the receiver aperture area for coherent systems. The effective diameter, $D_{EFF}$, of Eq. (2.9) represents the physical aperture diameter at which a heterodyne signal is reduced by 3 dB from the expected level in the absence of turbulence.

$$D_{EFF} = (0.0588 \lambda^2 / C_N^2 R)^{3/5} \quad (34)$$

Where $C_N^2$ is called the atmospheric structure function for refraction variation as shown in FIG. 13, which never exceeds $10^{-14}$. Solving for range we find it inversely proportional to aperture diameter, thus the smaller the aperture-though contrary to desires for received power—the longer range available for coherent detection. For $C_N = 10^{-14}$ and aperture $D_{EFF}$ set to 1 cm, R≈14 km. Thus atmospheric perturbations are not expected to significantly degrade evanescent wave coupling operation.

Unlike radio frequency ("RF") antennas, NCFDF accuracy is only dependent on where along the Fresnel curve its window surface interface operates, not the separation of its elements. While a large aperture RF antenna provides greater accuracy, for NCFDF a 0.25" missile can have accuracy equal to that of a 10" missile also using NCFDF albeit the former is bound to have much less aperture area, thus shorter detection range. NCFDF and thus evanescent wave coupling has an accuracy limited by how steeply a window surface can be tilted away from the target, which obviously ends at 90°. Whereas RF antenna accuracies are limited by how large they can be made—a practical, not a performance limit.

Thus, a means of coupling refracted light from a laser designated target to a photodiode for monopulse angle computation using NCFDF via prism coupling via evanescent wave coupling has been outlined. Evanescent wave coupling reduces spaces required by matching a thin prism window surface, coupling to a second prism window through an "evanescent field" present when illuminated by target reflections from a third party laser illuminator. The small size of evanescent wave coupling facilitates miniature missiles with their strong needs for motor and penetration volumes. Evanescent wave coupling enables a new class of "micro" missile optical guidance for darts or guided bullets as well as making NCFDF available to existing missile systems including internal components within their radome space otherwise disallowing use of NCFDF. However, the present invention may also be employed in other contexts, including civilian contexts.

Thus, the present invention employs evanescent wave coupling for Fresnel direction finding. More particularly, the present invention uses Fresnel transmission amplitudes resulting in monopulse angles as exploited by NCFDF. However, compared to window/light pipes currently employed in NCFDF, evanescent wave coupling collects light through a significantly smaller package and resides on or within the radome surface, for example, as is shown in FIG. 1 and FIG. 2, without NCFDF's window/light-pipe intrusion.

Some portions of the detailed descriptions herein are presented in terms of a software implemented process involving symbolic representations of operations on data bits within a memory in a computing system or a computing device. For instance, the processing effected by the application 624 on the raw data 630 to yield the processed data 631, i.e., the actual direction finding, is performed in software. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
   a radome; and
   an evanescent wave-coupled windowing system in the radome.

2. The apparatus of claim 1, wherein the radome comprises a blunt radome.

3. The apparatus of claim 2, wherein the blunt radome comprises a semi-spherical or hemispherical radome.

4. The apparatus of claim 1, wherein the radome comprises a sleek radome.

5. The apparatus of claim 4, wherein the sleek radome comprises a von Karman or an Ogive radome.

6. The apparatus of claim 1, wherein the evanescent wave-coupled windowing system comprises:
   a pair of evanescent wave-coupled prisms; and
   a waveguide for receiving evanescent waves output by the prisms responsive to incident radiation.

7. The apparatus of claim 6, wherein the prisms are evanescent wave-coupled through a fluid gap, the fluid having an index of refraction less than that of prisms.

8. The apparatus of claim 7, wherein the fluid is air or a bonding agent transparent to the incident radiation.

9. The apparatus of claim 6, wherein the waveguide comprises an optical fiber, a planar waveguide, a dielectric waveguide slab, a buried channel waveguide, a strip-loaded waveguide, a ridge waveguide, a rib waveguide, or a diffused waveguide.

10. The apparatus of claim 1, wherein the windowing system comprises a windowing collar about the radome.

11. The apparatus of claim 1, wherein the windowing system comprises a plurality of windows separated about the circumference of the radome.

12. An evanescent wave-coupled windowing system, comprising:
    a pair of evanescent wave-coupled prisms; and
    a waveguide for receiving evanescent waves output by the prisms responsive to incident radiation.

13. The evanescent wave-coupled windowing system of claim 12, wherein the prisms are evanescent wave-coupled through a fluid gap, the fluid having an index of refraction less than that of the prisms.

14. The evanescent wave-coupled windowing system of claim 13, wherein the fluid is air or a bonding agent transparent to the incident radiation.

15. The evanescent wave-coupled windowing system of claim 12, wherein the waveguide comprises an optical fiber, a planar waveguide, a dielectric waveguide slab, a buried channel waveguide, a strip-loaded waveguide, a ridge waveguide, a rib waveguide, or a diffused waveguide.

16. An apparatus, comprising:
    a radome;
    an evanescent wave-coupled windowing system in the radome;
    a platform body to which the radome is affixed; and
    a plurality of electronics housed in the apparatus, receiving a plurality of evanescent waves emitted from the windowing system responsive to incident radiation, and non-coherent, Fresnel direction finding an object reflecting the incident radiation.

17. The apparatus of claim 16, wherein the radome comprises a sleek radome.

18. The apparatus of claim 17, wherein the sleek radome comprises a von Karman or an Ogive radome.

19. The apparatus of claim 16, wherein the evanescent wave-coupled windowing system comprises:
    a pair of evanescent wave-coupled prisms; and
    a waveguide for receiving evanescent waves output by the prisms responsive to incident radiation.

20. The apparatus of claim 16, wherein the windowing system comprises a windowing collar about the radome.

21. The apparatus of claim 16, wherein the windowing system comprises a plurality of windows separated about the circumference of the radome.

22. The apparatus of claim 16, further comprising means for propelling the apparatus.

23. The apparatus of claim 22, further comprising means for guiding the apparatus.

24. The apparatus of claim 23, wherein the electronics are further capable of generating guidance control signals.

25. The apparatus of claim 16, further comprising means for guiding the apparatus.

26. The apparatus of claim 25, wherein the electronics are further capable of generating guidance control signals.

27. The apparatus of claim 16, wherein the electronics are further capable of telemetering data generated by the non-coherent, Fresnel direction finding to another location.

28. A method, comprising:
    receiving radiation reflected from an object that is incident upon a windowing system;
    emitting evanescent waves from the windowing system whose amplitudes are proportional to the angle of incidence of the radiation; and
    non-coherent, Fresnel direction finding the object.

29. The method of claim 28, further comprising propelling an apparatus in the direction of the object.

30. The method of claim 29, further comprising guiding the apparatus in the direction of the object.

31. The method of claim 28, further comprising means for guiding the apparatus.

32. The method of claim 28, wherein the electronics are further comprising telemetering data generated by the non-coherent, Fresnel direction finding to another location.

* * * * *